United States Patent
Koga et al.

(10) Patent No.: US 11,557,930 B2
(45) Date of Patent: *Jan. 17, 2023

(54) METHOD OF MANUFACTURING ROTARY ELECTRIC MACHINE ARMATURE

(71) Applicant: AISIN CORPORATION, Kariya (JP)

(72) Inventors: Kiyotaka Koga, Nishio (JP); Tomotsugu Sugihara, Okazaki (JP)

(73) Assignee: AISIN CORPORATION, Kariya (JP)

( * ) Notice: Subject to any disclaimer, the term of this patent is extended or adjusted under 35 U.S.C. 154(b) by 212 days.

This patent is subject to a terminal disclaimer.

(21) Appl. No.: 16/638,187

(22) PCT Filed: Sep. 20, 2018

(86) PCT No.: PCT/JP2018/034863
§ 371 (c)(1),
(2) Date: Feb. 11, 2020

(87) PCT Pub. No.: WO2019/059295
PCT Pub. Date: Mar. 28, 2019

(65) Prior Publication Data
US 2020/0366146 A1    Nov. 19, 2020

(30) Foreign Application Priority Data

Sep. 20, 2017  (JP) .............................. JP2017-180635
Mar. 26, 2018  (JP) .............................. JP2018-058079

(51) Int. Cl.
*H02K 3/12*    (2006.01)
*H02K 3/28*    (2006.01)
(Continued)

(52) U.S. Cl.
CPC ................. *H02K 3/12* (2013.01); *H02K 3/28* (2013.01); *H02K 15/0068* (2013.01); *H02K 15/064* (2013.01); *H02K 15/085* (2013.01)

(58) Field of Classification Search
CPC .. H02K 3/04; H02K 3/12; H02K 3/28; H02K 15/06; H02K 15/062; H02K 15/064; H02K 15/085
(Continued)

(56) References Cited

U.S. PATENT DOCUMENTS

2015/0305218 P1  10/2015  Klemm et al.
2016/0172919 A1   6/2016  Hattori
2017/0040859 A1   2/2017  Langlard

FOREIGN PATENT DOCUMENTS

DE         10038234 A1    2/2002
DE      102015225585 A1 *  6/2017  ............... H02K 3/28
(Continued)

OTHER PUBLICATIONS

Dec. 11, 2018 International Search Report issued in International Patent Application No. PCT/JP2018/034863.
(Continued)

*Primary Examiner* — Quyen P Leung
*Assistant Examiner* — Minki Chang
(74) *Attorney, Agent, or Firm* — Oliff PLC

(57) ABSTRACT

A method of manufacturing a rotary electric machine armature that includes a cylindrical armature core in which a plurality of slots that extend in an axial direction are disposed in a circumferential direction and a coil wound around the armature core, the slots having respective radial openings that open in a radial direction, and the coil being formed by joining a plurality of segment conductors to each other.

6 Claims, 16 Drawing Sheets

(51) Int. Cl.
*H02K 15/00* (2006.01)
*H02K 15/06* (2006.01)
*H02K 15/085* (2006.01)

(58) Field of Classification Search
USPC .................. 310/179, 195, 201, 202, 214
See application file for complete search history.

(56) References Cited

FOREIGN PATENT DOCUMENTS

| | | | |
|---|---|---|---|
| DE | 102015225585 A1 | | 6/2017 |
| FR | 3 020 521 A1 | | 10/2015 |
| JP | 2006-158044 A | | 6/2006 |
| JP | 2011-205834 A | | 10/2011 |
| JP | 2011205834 A | * | 10/2011 |
| JP | 2015-23771 A | | 2/2015 |

OTHER PUBLICATIONS

Jun. 18, 2020 Search Report issued in European Patent Application No. 18859052.5.
Dec. 11, 2018 International Search Report issued in International Patent Application No. PCT/JP2018/034865.
Jun. 18, 2020 Search Report issued in European Patent Application No. 18859458.4.
May 10, 2022 Office Action issued in U.S. Appl. No. 16/639,388.
Aug. 31, 2022 Notice of Allowance issued In U.S. Appl. No. 16/639,388.

* cited by examiner

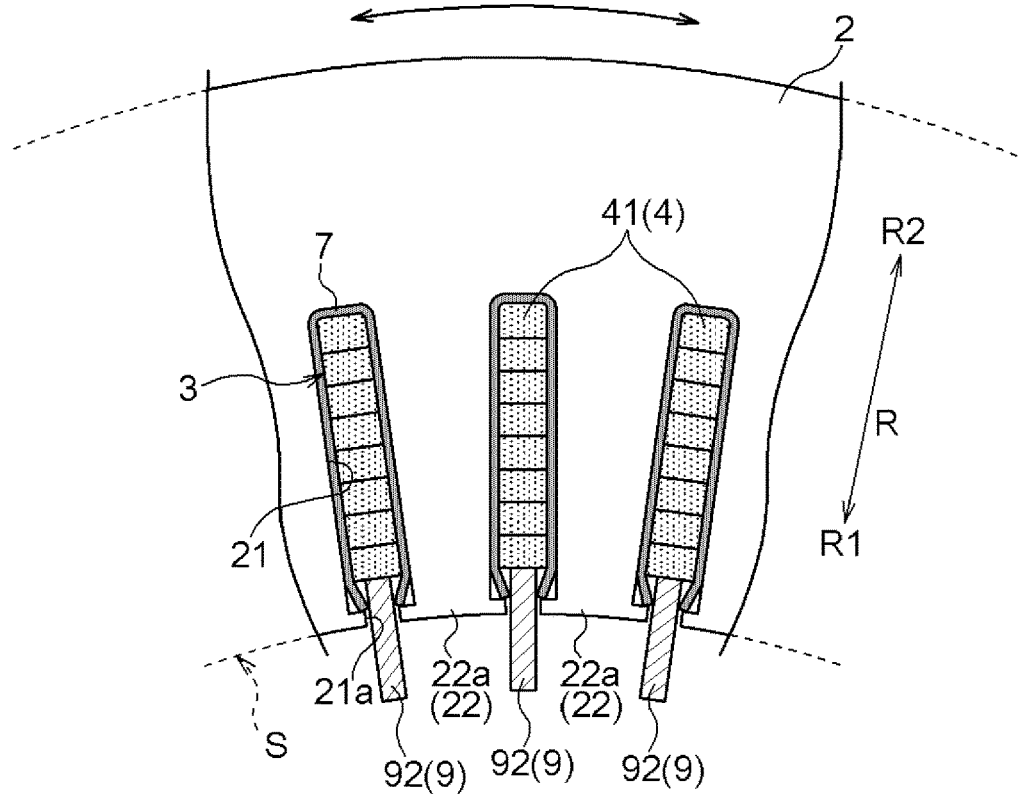
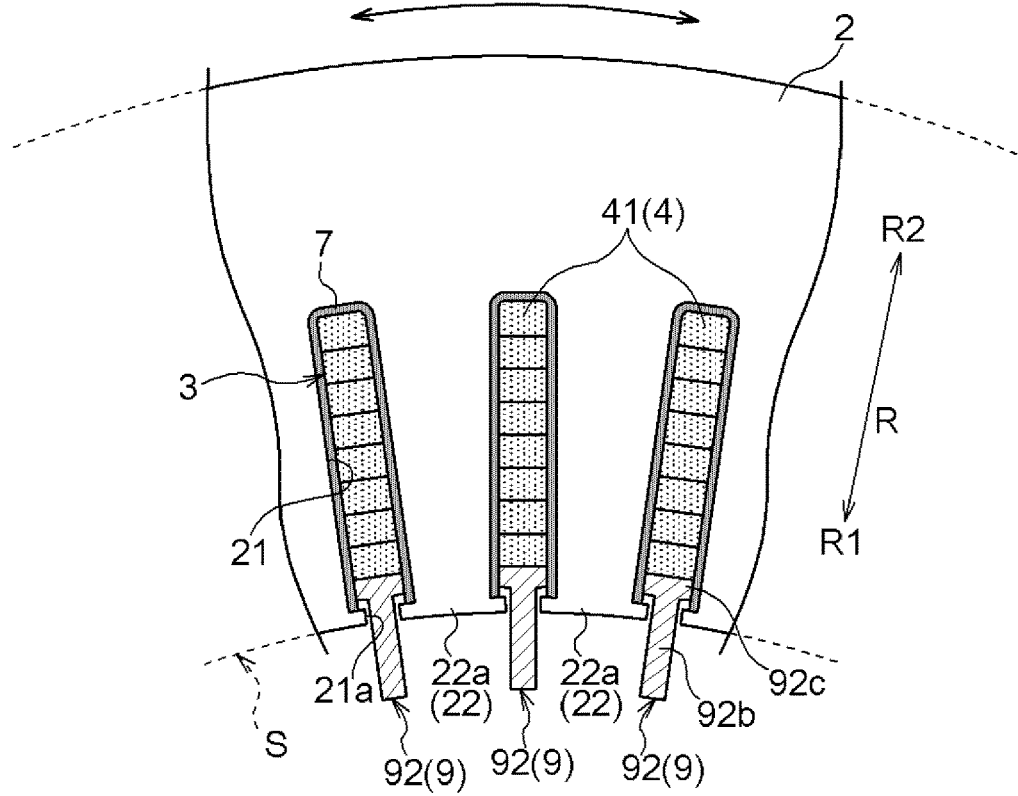

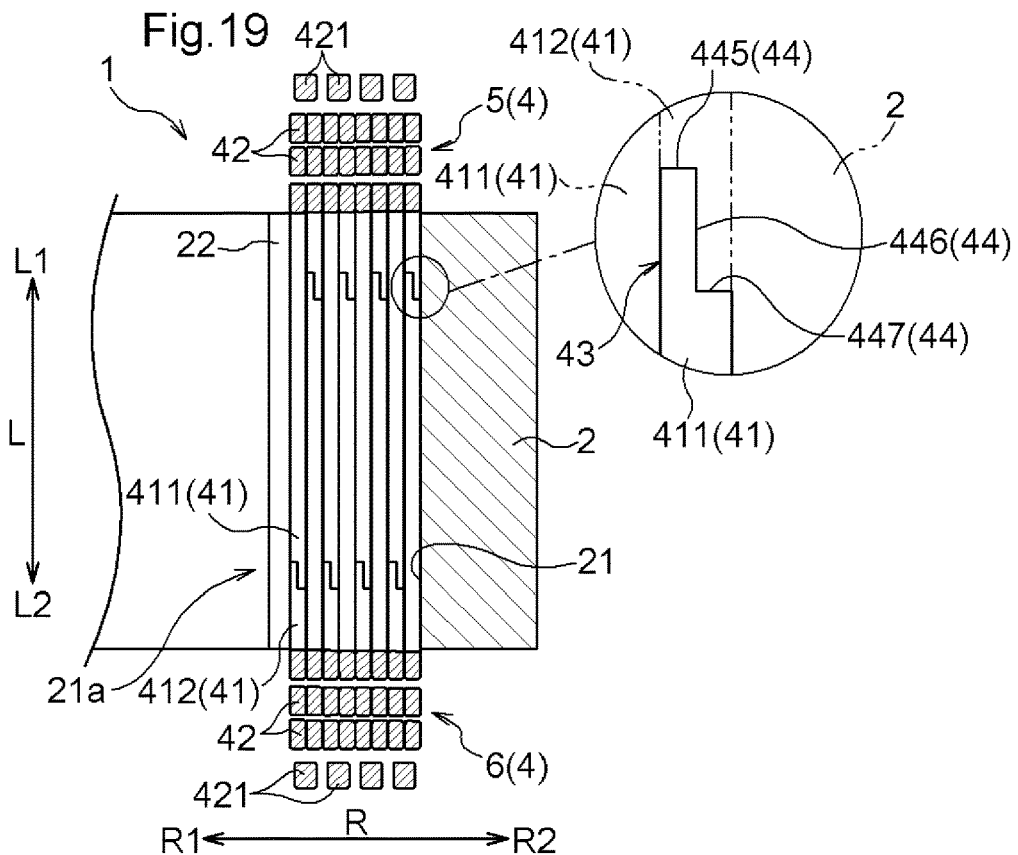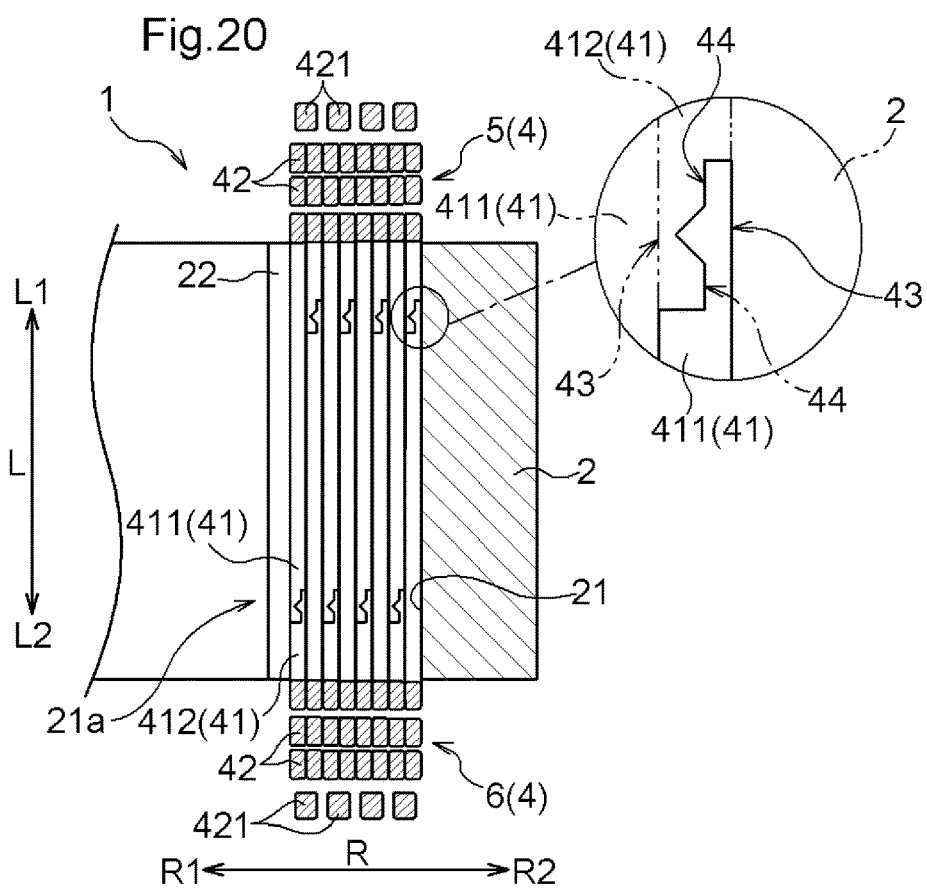

METHOD OF MANUFACTURING ROTARY ELECTRIC MACHINE ARMATURE

BACKGROUND

The present disclosure relates to a method of manufacturing a rotary electric machine armature that includes a cylindrical armature core in which a plurality of slots that extend in the axial direction are disposed in the circumferential direction and a coil wound around the armature core.

There is already known a technique of constituting a coil of a rotary electric machine armature by joining a plurality of segment conductors to each other. For example, Japanese Patent Application Publication No. 2015-023771 discloses a rotary electric machine armature (stator 10) that includes a coil constituted by joining first segment conductors (first-side conductor segments 28) disposed on one side of an armature core (stator core 14) in the axial direction and second segment conductors (second-side conductor segments 29 and 30) disposed on the other side of the armature core (stator core 14) in the axial direction. In the rotary electric machine armature (stator 10) according to Japanese Patent Application Publication No. 2015-023771, projecting portions (projecting portions 60) are formed at the distal end portions of conductor side portions (first-side leg portions 32 and 33) of the first segment conductors (first-side conductor segments 28), and recessed portions (recessed portions 62) are formed at the distal end portions of conductor side portions (second-side leg portions 40 and 41) of the second segment conductors (second-side conductor segments 29 and 30). The first segment conductors (first-side conductor segments 28) and the second segment conductors (second-side conductor segments 29 and 30) are joined to each other by being heated while being pressed from both sides in the axial direction with the projecting portions (projecting portions 60) and the recessed portions (recessed portions 62) engaged with each other.

In the rotary electric machine armature (stator 10) according to Japanese Patent Application Publication No. 2015-023771, however, the segment conductors are pressed from both sides in the axial direction, and therefore only coils contact each other and it is difficult to position the segment conductors for joining. Hence, it is difficult to appropriately join the first segment conductors (first-side conductor segments 28) and the second segment conductors (second-side conductor segments 29 and 30) to each other.

SUMMARY

Thus, it is desirable to achieve a technique that facilitates appropriately joining segment conductors to each other.

In view of the foregoing, the present disclosure provides a method of manufacturing a rotary electric machine armature with a characteristic configuration, that is, a method of manufacturing a rotary electric machine armature that includes a cylindrical armature core in which a plurality of slots that extend in an axial direction are disposed in a circumferential direction and a coil wound around the armature core, the slots having respective radial openings that open in a radial direction, and the coil being formed by joining a plurality of segment conductors to each other, the method including: preparing a plurality of the segment conductors and preparing the armature core, the segment conductors having respective conductor side portions that extend along the axial direction and respective crossover portions connected to the conductor side portions on an outer side of the armature core in the axial direction, the conductor side portions being provided with respective joint portions that have respective facing surfaces; arranging, when the segment conductor, among the plurality of segment conductors, the crossover portion of which is disposed on one side in the axial direction with respect to the armature core, is defined as a first segment conductor and the segment conductor, the crossover portion of which is disposed on the other side in the axial direction with respect to the armature core, is defined as a second segment conductor, at least either the conductor side portions of the first segment conductor or the conductor side portions of the second segment conductor in the slots such that the facing surface of one of the joint portions of the first segment conductor and the facing surface of one of the joint portions of the second segment conductor face each other; regulating movement of the conductor side portions in the radial direction; and joining the joint portion of the first segment conductor and the joint portion of the second segment conductor to each other by pressing at least one of the first segment conductor and the second segment conductor in the axial direction such that the first segment conductor and the second segment conductor approach each other while maintaining a regulating state.

With this characteristic configuration, movement of the conductor side portions of the segment conductors in the radial direction is regulated. Therefore, displacement and separation of the joint portions of the first segment conductor and the joint portions of the second segment conductor from each other in the radial direction can be restricted when such joint portions are to be joined to each other by pressing the first segment conductor and the second segment conductor in the axial direction. Thus, the segment conductors can be easily joined to each other appropriately.

BRIEF DESCRIPTION OF THE DRAWINGS

FIG. 11 illustrates a regulation process of a method of manufacturing a rotary electric machine armature according to a fourth embodiment.

FIG. 12 illustrates a regulation process of a method of manufacturing a rotary electric machine armature according to a fifth embodiment.

FIG. 19 is a sectional view, taken along the radial direction, of a part of a rotary electric machine armature according to another embodiment.

FIG. 20 is a sectional view, taken along the radial direction, of a part of a rotary electric machine armature according to still another embodiment.

DETAILED DESCRIPTION OF EMBODIMENTS

1. First Embodiment

A rotary electric machine armature according to a first embodiment will be described with reference to the drawings. Here, the rotary electric machine armature is described as a stator 1 for a rotary electric machine of an inner rotor type.

Herein, the term "rotary electric machine" refers to any of a motor (electric motor), a generator (electric generator), and a motor generator that functions both as a motor and as a generator as necessary.

1-1. Overall Configuration of Stator

Figure 1:
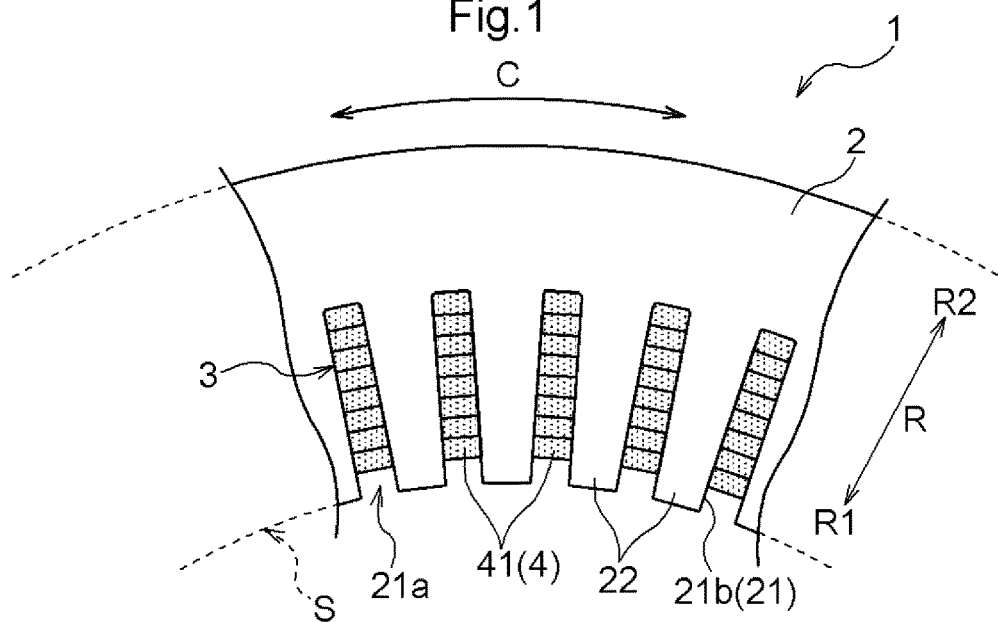
FIG. 1 is a sectional view, taken along the radial direction, of a part of a rotary electric machine armature according to a first embodiment.
Figure 2:
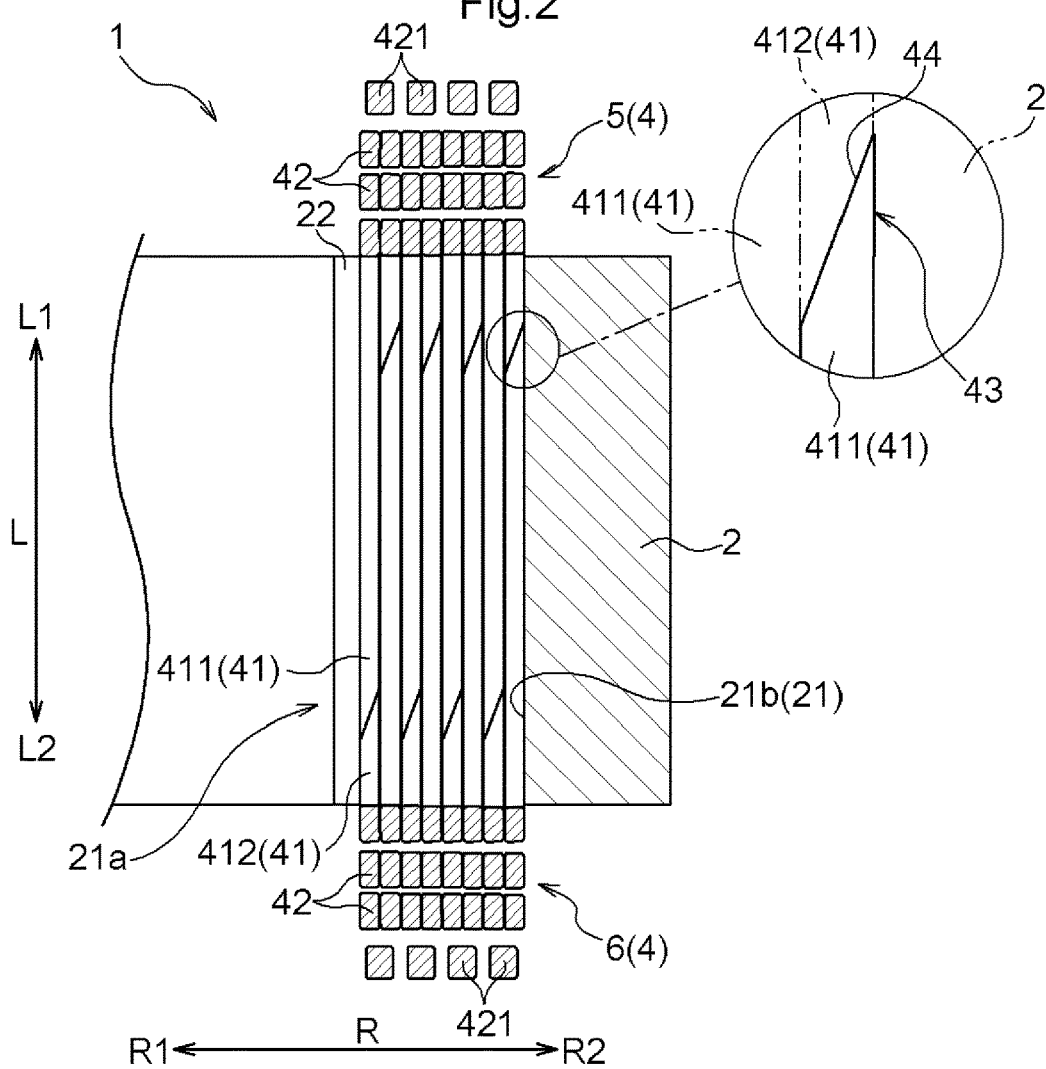
FIG. 2 is a sectional view, taken along the axial direction, of a part of the rotary electric machine armature according to the first embodiment.

The overall configuration of the stator 1 according to the present embodiment will be described below with reference to FIGS. 1 and 2. As illustrated in FIGS. 1 and 2, the stator 1 includes a cylindrical stator core 2 and a coil 3 wound around the stator core 2.

In the following description, unless otherwise noted, a "radial direction R", an "axial direction L", and a "circumferential direction C" are defined with reference to a core reference surface S of the cylindrical stator core 2 to be discussed later. Further, a "radially inner side R1" indicates the inner side in the radial direction R of the core reference surface S, and a "radially outer side R2" indicates the outer side in the radial direction R of the core reference surface S. In addition, a "first axial side L1" which is one side in the axial direction L indicates the upper side in the axial direction L in FIG. 2, and a "second axial side L2" which is the other side in the axial direction L indicates the lower side in the axial direction L in FIG. 2.

While a state in which the coil 3 is wound around the stator core 2 (see FIGS. 1 and 2) is assumed in the following description, the terms "radial direction R", "axial direction L", and "circumferential direction C" are also used for the other states.

The stator core 2 is formed using a magnetic material, and functions as an "armature core". In the present embodiment, the stator core 2 is a laminated structure in which a plurality of annular electrical steel plates are laminated on each other in the axial direction L. The stator core 2 has a plurality of slots 21 that extend along the axial direction L and that are distributed in the circumferential direction C. The plurality of slots 21 are disposed at constant intervals along the circumferential direction C. A tooth 22 is formed between two slots 21 that are adjacent to each other in the circumferential direction C.

Here, the "core reference surface" of the cylindrical stator core 2 discussed above is an imaginary surface that serves as a reference for the arrangement and the configuration of the slots 21. In the present embodiment, as illustrated in FIG. 1, an imaginary cylindrical surface (core inner peripheral surface) including the end surfaces of a plurality of teeth 22 on the radially inner side R1 is defined as the core reference surface S. The outer peripheral surface of the stator core 2 may be defined as the core reference surface S.

The slots 21 are formed so as to penetrate the stator core 2 in the axial direction L. In the present embodiment, the slots 21 are formed so as to extend in parallel with the axial direction L, and such that an imaginary line (i.e. the center line in the width direction) that passes through the middle portion of each of the slots 21 in the circumferential direction C extends in parallel with the radial direction R. The slots 21 have respective radially opening portions 21a that open in the radial direction R. In the present embodiment, the radially opening portions 21a open toward the radially inner side R1.

Although not illustrated, a rotor that includes permanent magnets or electromagnets to serve as a field is disposed on the radially inner side R1 of the stator 1 (stator core 2) so as to be rotatable relative to the stator 1, and rotated by a rotating magnetic field generated from the stator 1. That is, the stator 1 according to the present embodiment is a stator for a rotary electric machine of an inner rotor type and of a rotating field type.

1-2. Configuration of Coil

The configuration of the coil 3 will be described in detail below with reference to FIGS. 1 to 3. As illustrated in FIGS. 1 and 2, the coil 3 has an n-layer wound structure in which n conductor side portions 41 to be discussed later are arranged in the radial direction R. Here, n is an integer of two or more (e.g. an integer of two or more and ten or less; particularly preferably an even number of two or more), and is set in accordance with the magnitude of torque required from the rotary electric machine, an allowable counter-electromotive force, etc. In the present embodiment, the coil 3 has an eight-layer wound structure. In addition, the coil 3 has a structure in which at least one conductor side portion 41 is disposed in the circumferential direction C in each of the slots 21. In the present embodiment, one conductor side portion 41 is disposed in the circumferential direction C. That is, in the present embodiment, eight conductor side portions 41 are disposed in a row in each of the slots 21 so as to be stacked on each other in the radial direction R. Although not illustrated, a sheet-like insulating member is interposed between the coil 3 and the inner wall surfaces of the slots 21 in order to secure electrical insulation between the coil 3 and the stator core 2.

The coil 3 is formed by successively joining a plurality of segment conductors 4 to each other. The segment conductors 4 are constituted of a linear conductor with a rectangular cross-sectional shape, for example, taken along a plane that is orthogonal to the extension direction. The corner portions of the rectangular cross section of the linear conductor are preferably formed to be beveled, rounded, or otherwise chamfered as appropriate. Examples of a material that constitutes the linear conductor include copper and aluminum. In addition, the surface of the linear conductor is coated with an insulating film made of a resin etc. (such as polyimide, for example) except at portions (such as portions at which joint portions 43 to be discussed later are formed) for electrical connection with a different member.

Here, the configuration of the segment conductors 4 will be described with reference to FIG. 3. FIG. 3 illustrates a pair of segment conductors 4 joined to each other as viewed in the radial direction R, the axial direction L, and the circumferential direction C. The pair of segment conductors 4 as viewed in the radial direction R, the axial direction L, and the circumferential direction C are illustrated in the lower left, upper, and right portions, respectively, in FIG. 3.

In the following description, the segment conductor 4, a crossover portion 42 of which is disposed on the first axial side L1 with respect to the stator core 2, is defined as a first segment conductor 5, and the segment conductor 4, a crossover portion 42 of which is disposed on the second axial side L2 with respect to the stator core 2, is defined as a second segment conductor 6. In the case where the term "segment conductors 4" is used, both the first segment conductor 5 and the second segment conductor 6 are meant without distinction.

Figure 3:
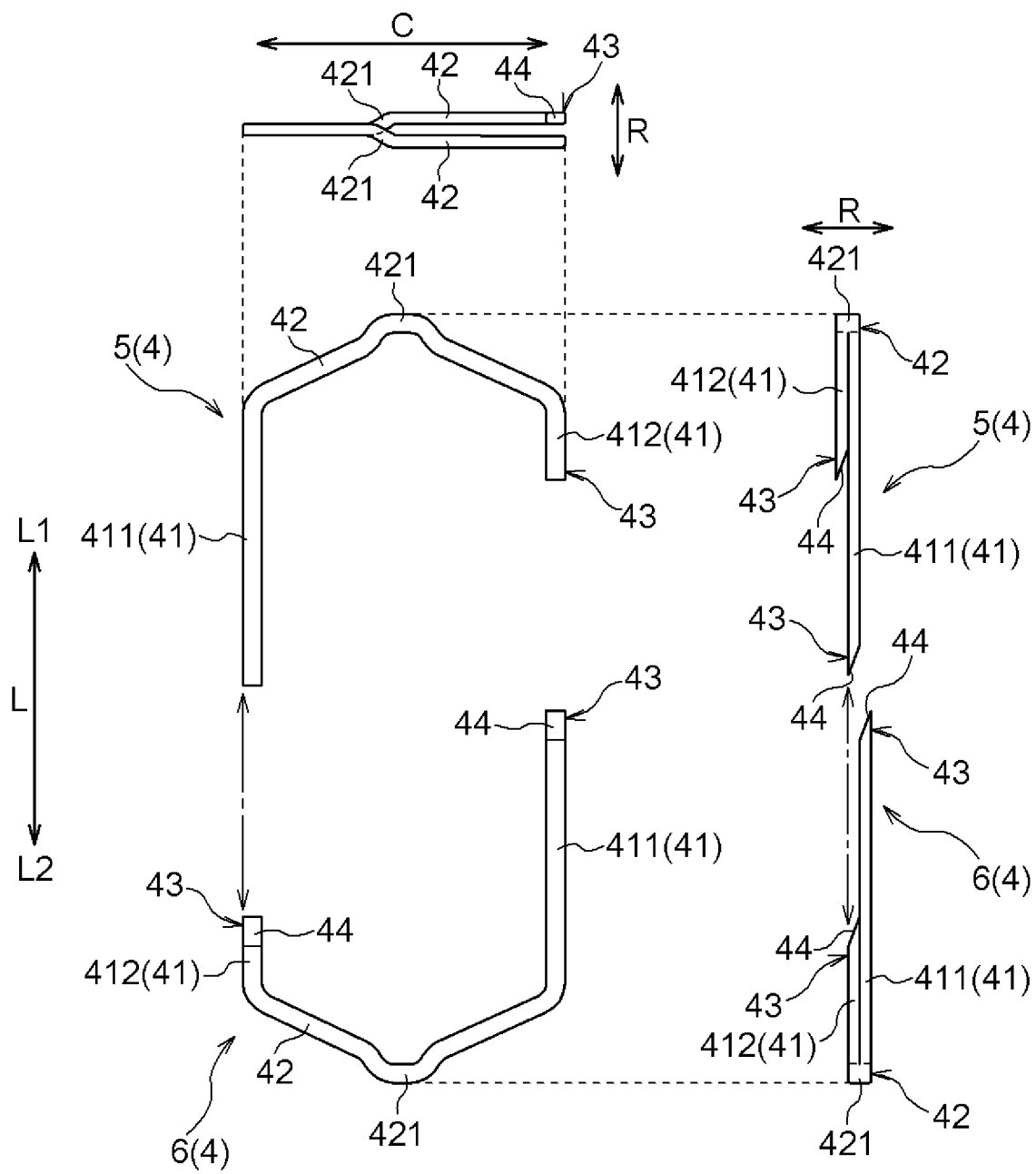
FIG. 3 illustrates a pair of segment conductors.

As illustrated in FIG. 3, the segment conductors 4 are formed in a U-shape as viewed in the radial direction R. The segment conductors 4 each have a pair of conductor side portions 41 and a crossover portion 42 that connects between the pair of conductor side portions 41. In the present embodiment, the pair of conductor side portions 41 have different lengths in the axial direction L. Therefore, in the following description, one of the pair of conductor side portions 41 that is longer in the axial direction L than the other is defined as a first conductor side portion 411, and the conductor side portion 41 that is shorter in the axial direction L than the first conductor side portion 411 is defined as a second conductor side portion 412. In the case where the term "conductor side portions 41" is used, both the first conductor side portion 411 and the second conductor side portion 412 are meant without distinction.

The conductor side portions 41 extend in the axial direction L in parallel with the slots 21. Joint portions 43 to be joined to different conductor side portions 41 are formed at the distal end portions of the conductor side portions 41, that is, the end portions thereof on the opposite side from the portions of connection with the crossover portion 42. The configuration of the joint portions 43 will be discussed in detail later.

The crossover portion 42 connects between the pair of conductor side portions 41. In the present embodiment, the crossover portion 42 of the first segment conductor 5 connects between the end portions, on the first axial side L1, of the pair of conductor side portions 41 of the first segment conductor 5, and the crossover portion 42 of the second segment conductor 6 connects between the end portions, on the second axial side L2, of the pair of conductor side portions 41 of the second segment conductor 6. That is, the crossover portion 42 is connected to the conductor side portions 41. In addition, the crossover portion 42 extends in the circumferential direction C. An offset portion 421 that offsets the pair of conductor side portions 41 in the radial direction R is formed at the crossover portion 42. In the present embodiment, the offset portion 421 is formed at the middle portion of the crossover portion 42 in the circumferential direction C, and formed so as to offset the pair of conductor side portions 41 in the radial direction R by one layer. With the presence of the offset portion 421, the pair of conductor side portions 41 of the segment conductor 4 are adjacent to each other without overlapping each other as viewed in the circumferential direction C.

Here, when two members are described as being disposed to "overlap" each other, it is indicated that, when an imaginary line that is parallel to the viewing direction is moved in directions that are orthogonal to the imaginary line, there is a region in which the imaginary line crosses both of the two members.

In the present embodiment, the coil 3 is wound around the stator core 2 by lap winding. Therefore, as illustrated in FIG. 3, in the case where one first segment conductor 5 and one second segment conductor 6 are extracted, the joint portion 43 of the first conductor side portion 411 of the first segment conductor 5 and the joint portion 43 of the second conductor side portion 412 of the second segment conductor 6 are joined to each other. The second conductor side portion 412 of the first segment conductor 5 and the first conductor side portion 411 of the second segment conductor 6 are disposed at the same position in the circumferential direction C, and disposed at different positions in the radial direction R. In addition, the joint portion 43 of the second conductor side portion 412 of the first segment conductor 5 and the joint portion 43 of the first conductor side portion 411 of a different second segment conductor 6 (not illustrated) are joined to each other. Similarly, the joint portion 43 of the first conductor side portion 411 of the second segment conductor 6 and the joint portion 43 of the second conductor side portion 412 of a different first segment conductor 5 (not illustrated) are joined to each other.

In the present embodiment, as illustrated in FIG. 2, the conductor side portions 41 are disposed in the slot 21, and the crossover portions 42 are disposed on the outer sides of the stator core 2 in the axial direction L. In the present embodiment, the joint portions 43 of the first segment conductors 5 and the joint portions 43 of the second segment conductors 6 are joined to each other in the slot 21.

The joint portions 43 have respective facing surfaces 44. The facing surfaces 44 of the pair of joint portions 43 which are joined to each other are formed so as to face each other. The joint portions 43 and the facing surfaces 44 are formed such that, with the pair of facing surfaces 44 facing each other and with the joint portions 43 joined to each other, the pair of conductor side portions 41 (the first conductor side portion 411 and the second conductor side portion 412) in which the joint portions 43 are formed extend straight along the axial direction L.

The facing surface 44 is formed so as not to have portions that overlap each other as viewed in the radial direction R over the entire facing surface 44. In the present embodiment, the facing surfaces 44 are formed over the entire axial end surfaces of the distal end portions of the conductor side portions 41, and are flat surfaces that extend in a direction inclined with respect to the axial direction L. In addition, one of the facing surfaces 44 which face each other is constituted of only a surface that faces one side in the radial direction R, and the other of the facing surfaces 44 which face each other is constituted of only a surface that faces the other side in the radial direction R. In the present embodiment, the facing surface 44 of the first conductor side portion 411 is constituted of only a surface that faces the radially inner side R1, and the facing surface 44 of the second conductor side portion 412 is constituted of only a surface that faces the radially outer side R2. Here, the wording "the facing surface 44 is constituted of only a surface that faces one side in the radial direction R" means that the facing surface 44 does not include a surface that faces the other side in the radial direction R. The wording "surface that faces the other side in the radial direction R" refers to a surface, the normal vector of which has a component toward the other side in the radial direction R. In addition, the wording "the facing surface 44 is constituted of only a surface that faces the other side in the radial direction R" means that the facing surface 44 does not include a surface that faces one side in the radial direction R. The wording "surface that faces one side in the radial direction R" refers to a surface, the normal vector of which has a component toward one side in the radial direction R.

The facing surface 44 is also formed so as not to have portions that overlap each other as viewed in the circumferential direction C over the entire facing surface 44. In the present embodiment, the facing surfaces 44 are disposed in parallel with the circumferential direction C. In addition, the facing surfaces 44 are formed so as not to have a portion projecting or dented in the axial direction L in the facing surfaces 44. Here, the wording "the facing surfaces 44 do not have a portion projecting or dented in the axial direction L" means that the facing surfaces 44 do not have a projection or a recess in the axial direction L, and the facing surfaces 44 may be formed with a projection or a recess in the radial direction R or the circumferential direction C. Meanwhile, a projection or a recess in the axial direction L may be formed by portions other than the facing surfaces 44 or by the facing surface 44 and a portion other than the facing surface 44. The "facing surfaces 44 have a portion projecting or dented in the axial direction L" in the case where the inclination directions of portions of the facing surfaces 44 are opposite to each other in the axial direction L, such as a case where the inclination direction of a part of the facing surface 44 is a direction toward one side in the axial direction and the inclination direction of another part of the facing surface 44 is a direction toward the other side in the axial direction.

Each of the facing surfaces 44 is shaped to match the shape of the other of the facing surfaces 44 which face each other. In the present embodiment, the facing surfaces 44 which face each other have the same shape as each other, and are disposed in parallel with each other.

With the facing surfaces 44 configured as described above, the pair of segment conductors 4 can receive a load in the radial direction R with the entire facing surfaces 44 of the joint portions 43 which are joined to each other. In Japanese Patent Application Publication No. 2015-023771 discussed above, on the other hand, projecting portions (projecting portions 60) are formed at the distal end portions of conductor side portions (first-side leg portions 32 and 33) of the first segment conductors (first-side conductor segments 28), and recessed portions (recessed portions 62) are formed at the distal end portions of conductor side portions (second-side leg portions 40 and 41) of the second segment conductors (second-side conductor segments 29 and 30). Therefore, the first segment conductors (first-side conductor segments 28) and the second segment conductors (second-side conductor segments 29 and 30) can receive a load in the radial direction with only a relatively small range of the facing surfaces.

2. Second Embodiment

A rotary electric machine armature according to a second embodiment will be described below with reference to FIG. 4. In the present embodiment, the configuration of the facing surfaces 44 of the joint portions 43 of the segment conductors 4 is different from that according to the first embodiment described above. The differences from the first embodiment described above will be mainly described below. The same elements as those in the first embodiment described above will not be particularly described.

Figure 4:
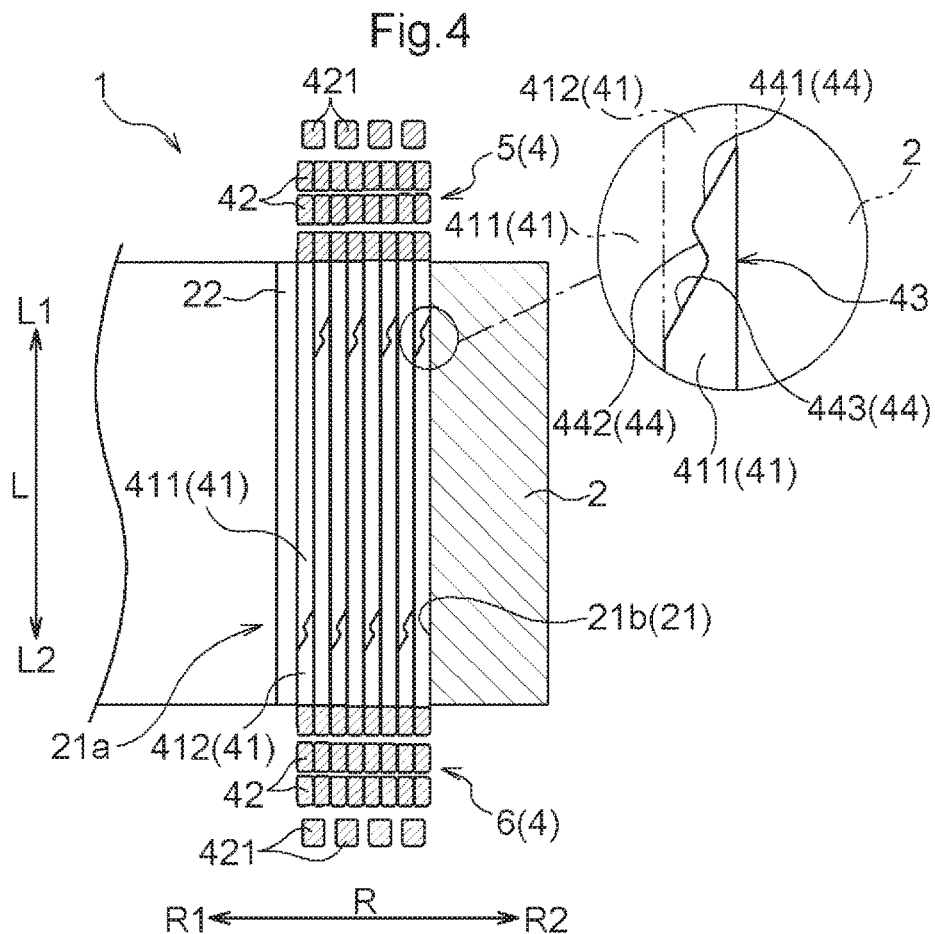
FIG. 4 is a sectional view, taken along the axial direction, of a part of a rotary electric machine armature according to a second embodiment.

In the present embodiment, as illustrated in FIG. 4, the facing surfaces 44 are formed over the entire axial end surfaces of the distal end portions of the conductor side portions 41, and each include a first inclined surface 441, a second inclined surface 442, and a third inclined surface 443. The first inclined surface 441, the second inclined surface 442, and the third inclined surface 443 are disposed in this order from the distal end portion toward the base end portion of the conductor side portion 41 in the axial direction L. In the present embodiment, the facing surfaces 44 which face each other have the same shape as each other, and are disposed in parallel with each other. In the present example, in addition, all of the first inclined surface 441, the second inclined surface 442, and the third inclined surface 443 are disposed in parallel with the circumferential direction C.

The first inclined surface 441 is formed so as to extend along a direction inclined with respect to the axial direction L. In the present embodiment, the first inclined surface 441 is a flat surface formed to include the tip portion of the conductor side portion 41 and extending in a direction inclined with respect to the axial direction L.

The second inclined surface 442 is formed so as to extend along a direction that intersects the direction in which the first inclined surface 441 extends. In the present embodiment, the second inclined surface 442 is disposed between the first inclined surface 441 and the third inclined surface 443 in the axial direction L. The second inclined surface 442 is formed to be continuous with the first inclined surface 441, and forms a projecting portion projecting in the radial direction R together with the first inclined surface 441. Therefore, the second inclined surface 442 is a flat surface that extends in a direction inclined with respect to the axial direction L in a different direction from the first inclined surface 441. In addition, the second inclined surface 442 is formed so as to overlap the first inclined surface 441 as viewed in the axial direction L. In the present embodiment, the entire second inclined surface 442 overlaps the first inclined surface 441 as viewed in the axial direction L. In the present example, the first inclined surface 441 and the second inclined surface 442 are smoothly continuous with each other via a curved portion. However, the present disclosure is not limited thereto. It is also suitable if the first inclined surface 441 and the second inclined surface 442 are continuous by intersecting each other via an angled portion.

The third inclined surface 443 is formed so as to extend along a direction that intersects the direction in which the second inclined surface 442 extends. In the present embodiment, the third inclined surface 443 is disposed on the side of the base end portion with respect to the second inclined surface 442 in the axial direction L. The third inclined surface 443 is formed to be continuous with the second inclined surface 442, and forms a recessed portion dented in the radial direction R together with the second inclined surface 442. Therefore, the third inclined surface 443 is a flat surface that extends in a direction inclined with respect to the axial direction L in a different direction from the second inclined surface 442. Specifically, the third inclined surface 443 is a flat surface that extends in a direction that is parallel to the first inclined surface 441. Further, the length of the third inclined surface 443 in the extension direction is the same as the length of the first inclined surface 441 in the extension direction. In the present embodiment, the second inclined surface 442 and the third inclined surface 443 are smoothly continuous with each other via a curved portion. However, the present disclosure is not limited thereto. It is also suitable if the second inclined surface 442 and the third inclined surface 443 are continuous by intersecting each other via an angled portion.

In the present embodiment, with the pair of conductor side portions 41 joined to each other, the first inclined surface 441 of the first conductor side portion 411 and the third inclined surface 443 of the second conductor side portion 412 face each other, the second inclined surface 442 of the first conductor side portion 411 and the second inclined surface 442 of the second conductor side portion 412 face each other, and the third inclined surface 443 of the first conductor side portion 411 and the first inclined surface 441 of the second conductor side portion 412 face each other.

In the present embodiment, as described above, the facing surface 44 is formed so as not to have portions that overlap each other as viewed in the radial direction R and the circumferential direction C over the entire facing surface 44. In the present embodiment, in addition, the facing surface 44 of the first conductor side portion 411 is constituted of only a surface that faces the radially inner side R1, and the facing surface 44 of the second conductor side portion 412 is constituted of only a surface that faces the radially outer side R2. In the present embodiment, in addition, the facing surfaces 44 are formed so as not to have a portion projecting or dented in the axial direction L in the facing surfaces 44.

3. First Reference Form of Method of Manufacturing Rotary Electric Machine Armature A manufacturing process S1 for the stator 1, which is a first reference form of a method of manufacturing a rotary electric machine armature, will be described below with reference to FIGS. 5 to 7. The stator 1 according to the second embodiment described above (see FIG. 4) is manufactured in the manufacturing process S1 according to the present reference form.

Figure 5:
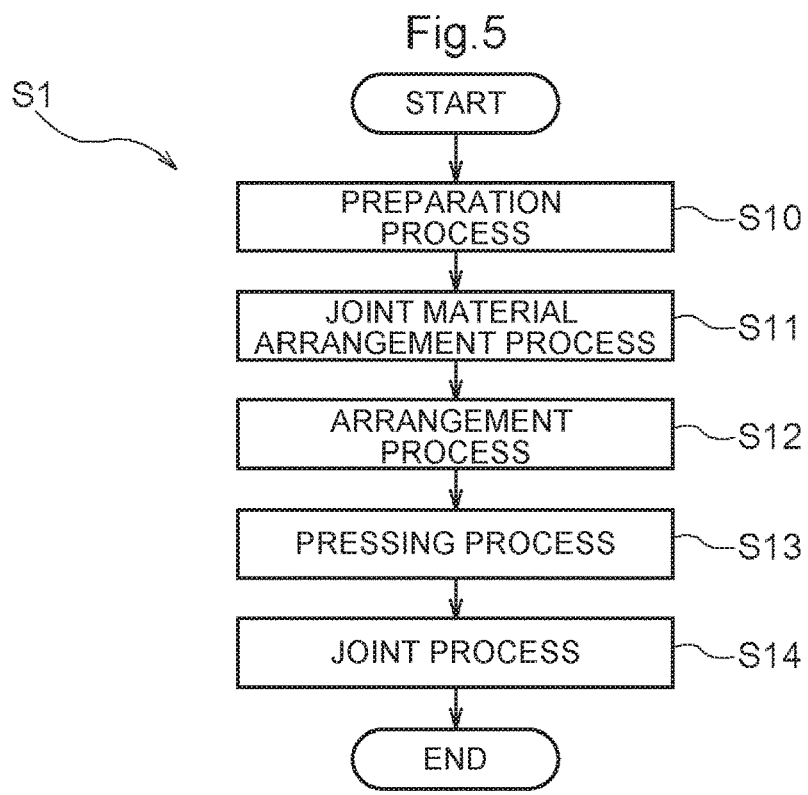
FIG. 5 is a flowchart illustrating a method of manufacturing the rotary electric machine armature according to a first reference form.

As illustrated in FIG. 5, the manufacturing process S1 according to the present reference form includes a preparation process S10, a joint material arrangement process S11, an arrangement process S12, a pressing process S13, and a joint process S14.

In the preparation process S10, a plurality of segment conductors 4 that constitute a coil 3 and a stator core 2 are prepared. In the preparation process S10, a plurality of first segment conductors 5 and second segment conductors 6, the number of the second segment conductors corresponding to the number of the first segment conductors 5, are prepared as the segment conductors 4.

Figure 6:
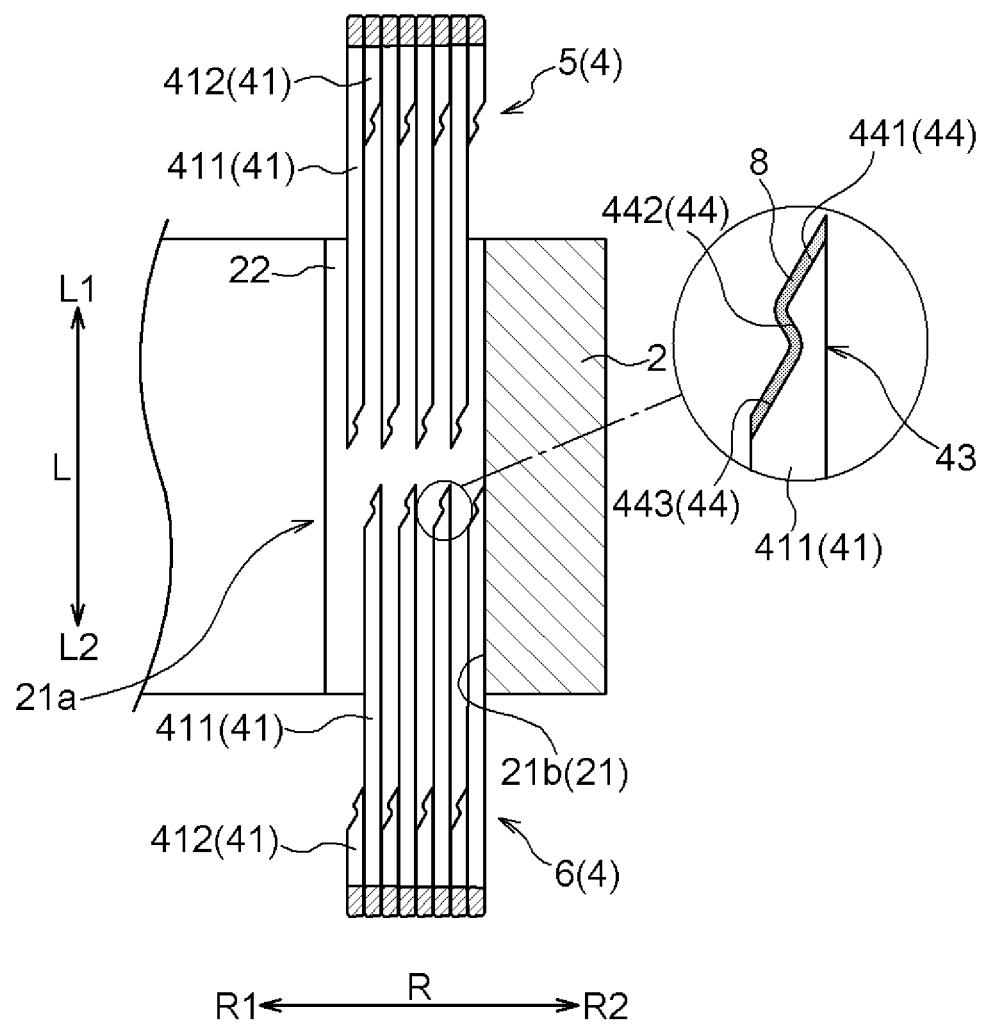
FIG. 6 illustrates an arrangement process.

In the joint material arrangement process S11, a conductive joint material 8 is disposed on at least one of the facing surfaces 44 which face each other. As illustrated in FIG. 6, the conductive joint material 8 is a joint material that joins the joint portions 43 of the first segment conductor 5 and the joint portions 43 of the second segment conductor 6 to each other while securing conductivity. Examples of the conductive joint material 8 include a paste-like joint material containing silver nanoparticles.

In the arrangement process S12, at least either the conductor side portions 41 of the first segment conductor 5 and the conductor side portions 41 of the second segment conductor 6 are disposed in the slots 21 such that the facing surface 44 of one of the joint portions 43 of the first segment conductor 5 and the facing surface 44 of one of the joint portions 43 of the second segment conductor 6 face each other. In the arrangement process S12 according to the present embodiment, as illustrated in FIG. 6, the plurality of first segment conductors 5 and the plurality of second segment conductors 6 are disposed in the plurality of slots 21 such that the facing surface 44 of the first conductor side portion 411 of the first segment conductor 5 and the facing surface 44 of the second conductor side portion 412 of the second segment conductor 6 face each other and the facing surface 44 of the second conductor side portion 412 of the first segment conductor 5 and the facing surface 44 of the first conductor side portion 411 of a different second segment conductor 6 face each other in each of the slots 21.

Figure 7:
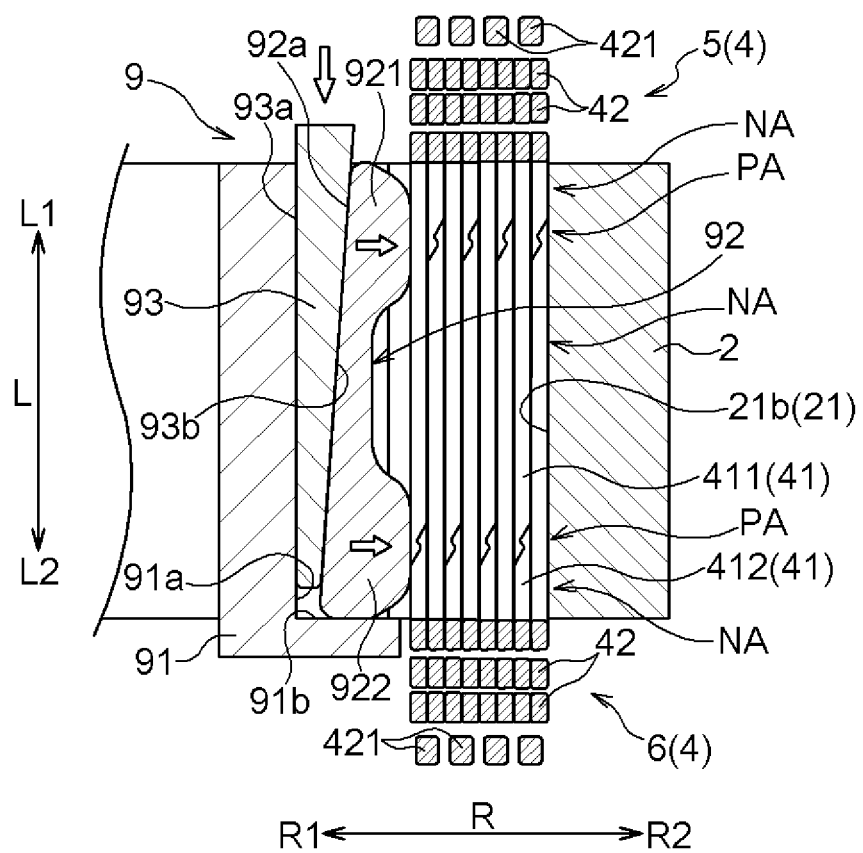
FIG. 7 illustrates a pressing process.

In the pressing process S13, at least a part of the pair of conductor side portions 41, which are to be joined to each other, of the plurality of segment conductors 4 is pressed in the radial direction R. In the pressing process S13 according to the present reference form, portions of the plurality of segment conductors 4 at which the pair of joint portions 43 to be joined to each other overlap each other as viewed in the radial direction R are pressed from the radially opening portion 21a. In other words, in the pressing process S13, a region in which the pair of facing surfaces 44 of the pair of joint portions 43 to be joined face each other as viewed in the radial direction R is pressed from the radially opening portion 21a. In the present reference form, as illustrated in FIG. 7, the pressing process S13 is performed using a pressing device 9. The pressing device 9 includes a fixed member 91, a plurality of movable members 92, and an insertion member 93.

The fixed member 91 is formed in a cylindrical shape, and has an outside diameter that enables the fixed member 91 to be disposed on the radially inner side R1 with respect to the plurality of segment conductors 4 which are disposed in the slots 21. The fixed member 91 is disposed on the radially inner side R1 with respect to the core inner peripheral surface (core reference surface S) in the stator core 2 so as to be coaxial with the stator core 2, and fixed to the stator core 2. The fixed member 91 has an outer peripheral surface 91a that extends along the axial direction L over the entire region in the circumferential direction C, and a bottom surface 91b that extends from an end portion of the outer peripheral surface 91a on the second axial side L2 toward the radially outer side R2. In the present reference form, the outer peripheral surface 91a of the fixed member 91 is formed in a cylindrical shape, and the bottom surface 91b is formed in a circular plate shape.

The pressing device 9 includes movable members 92, the number of the movable members 92 being the same as that of the slots 21 of the stator core 2. The movable members 92 are each formed in a plate shape. All the movable members 92 are disposed radially with reference to the axis of the stator core 2 in correspondence with the slots 21 of the stator core 2. In addition, the movable members 92 are inserted into the respective slots 21 from the respective radially opening portions 21a of the slots 21. In this event, the movable members 92 are each disposed such that a part of the movable member 92 on the radially inner side R1 projects toward the radially inner side R1 with respect to the radially opening portion 21a of the slot 21. In addition, the movable members 92 are placed on the bottom surface 91b of the fixed member 91. Further, the movable member 92 has an inner peripheral-side inclined surface 92a. The inner peripheral-side inclined surface 92a is an inclined surface formed on the radially inner side R1 of the movable member 92 to extend toward the radially inner side R1 from the first axial side L1 toward the second axial side L2.

The movable member 92 also has a first pressing portion 921 and a second pressing portion 922. The first pressing portion 921 and the second pressing portion 922 are formed on a surface of the movable member 92 on the radially outer side R2. The first pressing portion 921 is formed so as to project toward the radially outer side R2 with respect to portions on both sides in the axial direction L, and disposed in accordance with the position, in the axial direction L, of a portion at which the joint portion 43 of the second conductor side portion 412 of the first segment conductor 5 and the joint portion 43 of the first conductor side portion 411 of the second segment conductor 6 overlap each other as viewed in the radial direction R. The second pressing portion 922 is formed so as to project toward the radially outer side R2 with respect to portions on both sides in the axial direction L, and disposed in accordance with the position, in the axial direction L, of a portion at which the joint portion 43 of the first conductor side portion 411 of the first segment conductor 5 and the joint portion 43 of the second conductor side portion 412 of the second segment conductor 6 overlap each other as viewed in the radial direction R. In the present reference form, respective portions of the first pressing portion 921 and the second pressing portion 922 that project most toward the radially outer side R2 are each shaped as a flat surface that is parallel to the axial direction L.

The insertion member 93 is formed in a cylindrical shape, and inserted into a space in the radial direction R between the fixed member 91 and the movable members 92. The insertion member 93 has an inner peripheral surface 93a and an outer peripheral-side inclined surface 93b. The inner peripheral surface 93a of the insertion member 93 is formed along the outer peripheral surface 91a of the fixed member 91. Here, the inner peripheral surface 93a is a cylindrical surface that has an inside diameter that is slightly larger than the diameter of the outer peripheral surface 91a of the fixed member 91. Meanwhile, the outer peripheral-side inclined surface 93b of the insertion member 93 is a truncated cone surface formed such that the inclination angle thereof with respect to the axial direction L is the same as the angle of the inner peripheral-side inclined surfaces 92a of the movable members 92. In addition, the thickness of the insertion member 93 in the radial direction R is set such that the lower end portion of the insertion member 93 which contacts the inner peripheral-side inclined surfaces 92a of the movable members 92 does not abut against the bottom surface 91b of the fixed member 91 with the movable members 92 moved most to the radially outer side R2 within the movable range thereof.

In the pressing process S13, the movable members 92 are moved toward the radially outer side R2 along the bottom surface 91b of the fixed member 91 by inserting the insertion member 93 from the first axial side L1 into a space in the radial direction R between the fixed member 91 and the plurality of movable members 92 which are disposed radially. Consequently, the first pressing portion 921 and the second pressing portion 922 of the movable member 92 press the segment conductor 4 in the slot 21 from the radially inner side R1 (i.e. from the radially opening portion 21a of the slot 21). In this way, in the pressing process S13 according to the present reference form, the joint portions 43 of the segment conductors 4 in all the slots 21 can be pressed using the pressing device 9. In this event, the pair of conductor side portions 41 to be joined to each other are disposed straight along the axial direction L, and therefore a pressing force applied by the first pressing portion 921 and a pressing force applied by the second pressing portion 922 are unlikely to be non-uniform.

In the present reference form, when the segment conductor 4 is pressed by the movable member 92, the movable member 92 is moved toward the radially outer side R2 such that the pressing force of the movable member 92 is transferred to an inner wall surface 21b of the slot 21 on the opposite side (radially outer side R2) from the side of the radially opening portion 21a. In this way, the joint portions 43 of all the segment conductors 4 in each of the slots 21 are pressed in the state of being interposed between the movable member 92 and the inner wall surface 21b of the slot 21 on the opposite side (radially outer side R2) from the side of the radially opening portion 21a.

In the pressing process S13 according to the present reference form, as illustrated in FIG. 7, a pressing region PA of the conductor side portions 41 of the plurality of segment conductors 4 which are disposed in the slot 21, including the joint portions 43 of the first segment conductors 5 and the joint portions 43 of the second segment conductors 6, is pressed by the first pressing portion 921 and the second pressing portion 922. On the other hand, a non-pressing region NA of the conductor side portions 41 of the plurality of segment conductors 4 which are disposed in the slot 21, excluding the pressing region PA, is not pressed.

In the present reference form, the joint portion 43 of the second conductor side portion 412 of the first segment conductor 5 and the joint portion 43 of the first conductor side portion 411 of the second segment conductor 6 are joined to each other, and the joint portion 43 of the first conductor side portion 411 of the first segment conductor 5 and the joint portion 43 of the second conductor side portion 412 of the second segment conductor 6 are joined to each other. Therefore, a portion of the plurality of segment conductors 4 disposed in the slot 21 at which the pair of joint portions 43 to be joined to each other overlap each other as viewed in the radial direction R is positioned at two locations in the axial direction L. Hence, in the present reference form, the pressing region PA is positioned at two locations, in the axial direction L, of the plurality of segment conductors 4 which are disposed in the slot 21. The present disclosure is not limited thereto. A portion at which the pair of joint portions 43 to be joined to each other overlap each other as viewed in the radial direction R may be positioned at one or three or more locations, in the axial direction L, of the plurality of segment conductors 4 which are disposed in the slot 21. That is, the pressing region PA may be positioned at one or three or more locations, in the axial direction L, of the plurality of segment conductors 4 which are disposed in the slot 21.

In the joint process S14, the joint portion 43 of the first segment conductor 5 and the joint portion 43 of the second segment conductor 6 are joined to each other while maintaining the pressing state in the pressing process S13 discussed above. In the present reference form, the paste-like joint material containing silver nanoparticles discussed above is adopted as the conductive joint material 8. Therefore, in the joint process S14, the joint portion 43 of the first segment conductor 5 and the joint portion 43 of the second segment conductor 6 are joined to each other by heating and melting the conductive joint material 8 using a heater etc., for example.

4. Third Embodiment

A rotary electric machine armature according to a third embodiment will be described below with reference to FIG. 8. In the present embodiment, the configuration of the facing surfaces 44 of the joint portions 43 of the segment conductors 4 is different from that according to the first embodiment described above and the second embodiment described above. The differences from the first embodiment described above and the second embodiment described above will be mainly described below. The same elements as those in the first embodiment described above and the second embodiment described above will not be particularly described.

Figure 8:
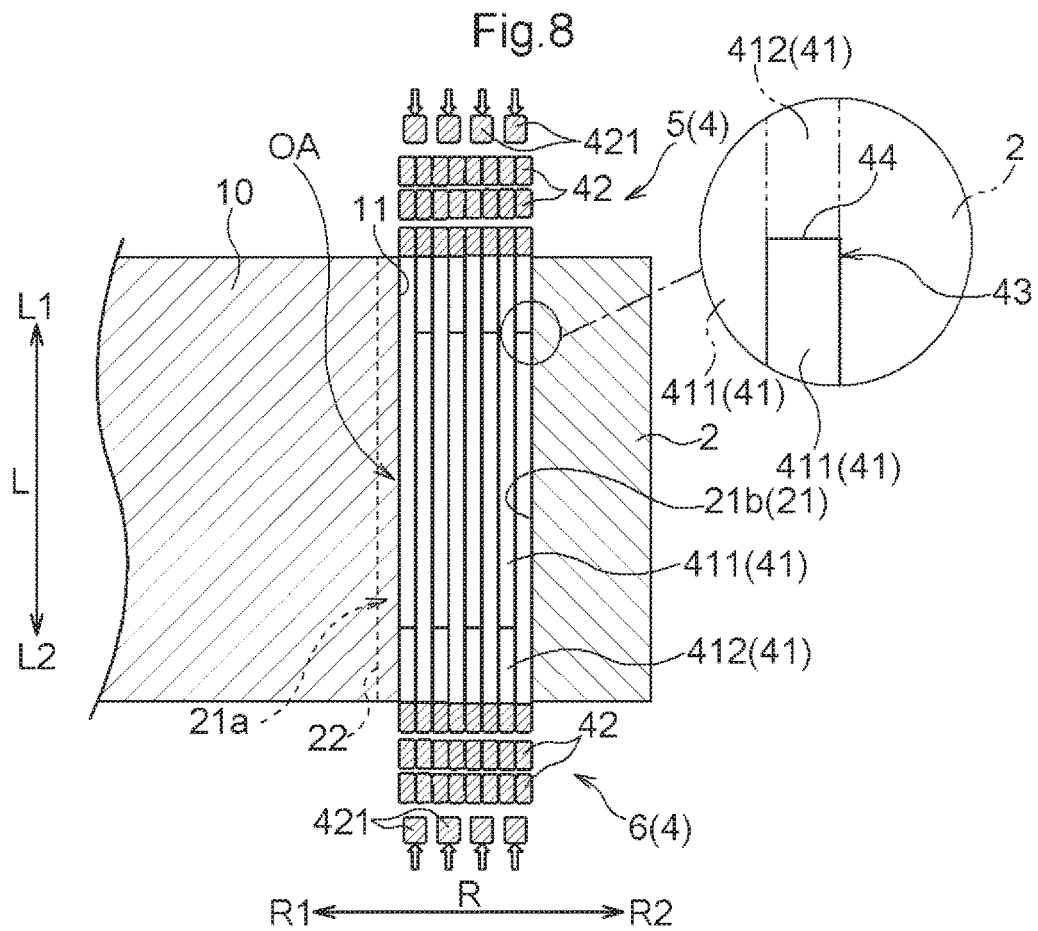
FIG. 8 illustrates a regulation process of a method of manufacturing a rotary electric machine armature according to a third embodiment.

In the present embodiment, as illustrated in FIG. 8, the facing surfaces 44 are formed over the entire axial end surfaces of the distal end portions of the conductor side portions 41, and are flat surfaces that extend along the radial direction R. In the present embodiment, the facing surfaces 44 are disposed in parallel with the circumferential direction C. In the present embodiment, in addition, the facing surfaces 44 which face each other have the same shape as each other, and are disposed in parallel with each other.

Figure 9:
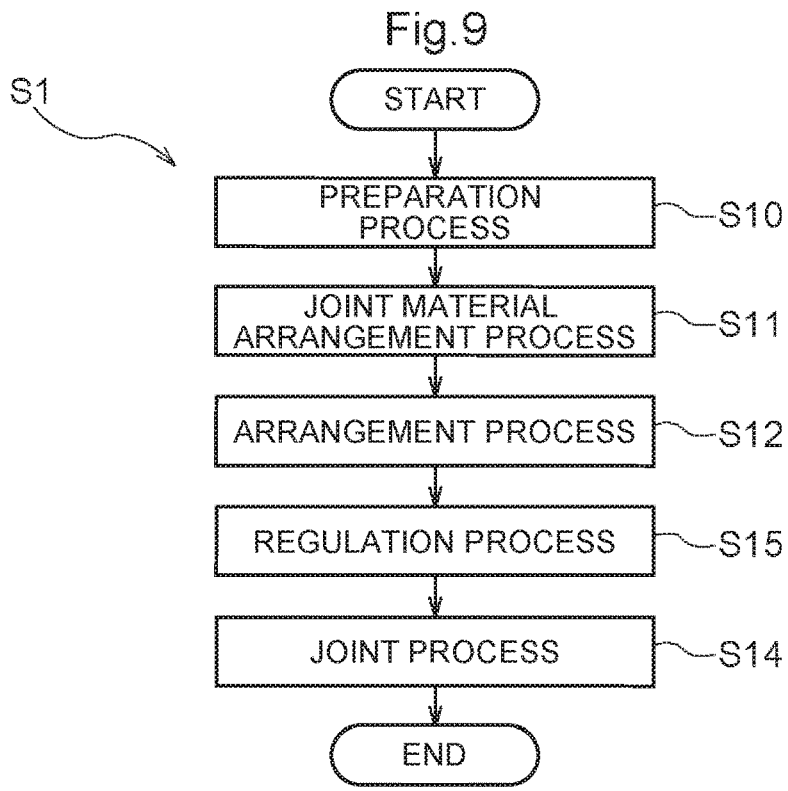
FIG. 9 is a flowchart illustrating the method of manufacturing the rotary electric machine armature according to the third embodiment.

As illustrated in FIG. 9, the manufacturing process S1 for the stator 1 according to the present embodiment includes a regulation process S15 in place of the pressing process S13 discussed above. In the regulation process S15, movement of the conductor side portions 41 in the radial direction R is regulated. In the regulation process S15 according to the present embodiment, movement of the joint portions 43 in the radial direction R in the slot 21 is regulated. The pressing process S13 discussed above is one form of the regulation process S15. In the present embodiment, as illustrated in FIG. 8, the regulation process S15 is performed using a regulation member 10.

The regulation member 10 is disposed on the side of the radially opening portion 21a (radially inner side R1) with respect to the conductor side portions 41 positioned most on the side of the radially opening portion 21a (radially inner side R1) in the slot 21. In the present embodiment, the regulation member 10 is inserted into the slot 21 through the radially opening portion 21a. That is, the width of the regulation member 10 in the circumferential direction C is smaller than the width of the radially opening portion 21a in the circumferential direction C.

The regulation member 10 has a regulation surface 11 that faces the conductor side portions 41 of the segment conductors 4 which are disposed in the slot 21. The regulation surface 11 regulates movement, in the radial direction R, of the conductor side portions 41 of the segment conductors 4 which are disposed in the slot 21. The regulation surface 11 is formed so as to face an object region OA which is the entire region or a part of the region, in the axial direction L, of both the conductor side portions 41 of the first segment conductors 5 and the conductor side portions 41 of the second segment conductors 6. In the present embodiment, the object region OA is the entire region, in the axial direction L, of both the conductor side portions 41 of the first segment conductors 5 and the conductor side portions 41 of the second segment conductors 6. In addition, the regulation surface 11 is shaped along a surface that faces the regulation surface 11 in the object region OA. Specifically, in the present embodiment, the regulation surface 11 is shaped along the side surfaces of the conductor side portions 41 in the radial direction R. That is, in the present embodiment, the regulation surface 11 is a flat surface that extends along the axial direction L, and formed in parallel with the circumferential direction C.

In the regulation process S15, the regulation member 10 is disposed on the side of the radially opening portion 21a (radially inner side R1) with respect to the pair of conductor side portions 41 positioned most on the side of the radially opening portion 21a (radially inner side R1) in the slot 21. Then, the regulation member 10 is disposed such that the regulation surface 11 extends along the pair of conductor side portions 41 positioned most on the side of the radially opening portion 21a (radially inner side R1). In the present example, the regulation member 10 causes the regulation surface 11 to contact the pair of conductor side portions 41 so as not to press the pair of conductor side portions 41. At this time, it is suitable if the pair of conductor side portions 41 positioned most on the opposite side (radially outer side R2) from the side of the radially opening portion 21a contact the inner wall surface 21b of the slot 21 on the radially outer side R2, and if a plurality of pairs of conductor side portions 41 arranged in the radial direction R in the slot 21 contact each other. However, there may be a gap therebetween.

In the joint process S14 according to the present embodiment, at least either the first segment conductors 5 or the second segment conductors 6 are pressed in the axial direction L such that the first segment conductors 5 and the second segment conductors 6 approach each other while maintaining the regulating state in the regulation process S15. In the present example, the plurality of segment conductors 4 which are disposed in the slot 21 are pressed from both sides in the axial direction L (the first axial side L1 and the second axial side L2) while maintaining the regulating state in the regulation process S15. At this time, movement in the radial direction R of the plurality of pairs of conductor side portions 41 which are arranged in the radial direction R in the slot 21 is regulated between the regulation surface 11 of the regulation member 10 and the inner wall surface 21b of the slot 21 on the radially outer side R2. Therefore, even in the case where the plurality of segment conductors 4 are pressed from both sides in the axial direction L, the pair of joint portions 43 which face each other are not displaced or separated from each other in the radial direction.

In the joint process S14 according to the present embodiment, the regulation surface 11 is fixed in position in the radial direction R. In the present example, the regulation surface 11 is formed on the end surface of the regulation member 10 on the radially outer side R2, and therefore the regulation surface 11 is fixed in position in the radial direction R by fixing the regulation member 10 in position in the radial direction R.

It is not necessary to cause the regulation surface 11 of the regulation member 10 to contact the pair of conductor side portions 41 positioned most on the side of the radially opening portion 21a (radially inner side R1) before the plurality of segment conductors 4 are pressed in the axial direction L as long as movement of the conductor side portions 41 in the radial direction R can be regulated. The regulation member 10 is not limited to the configuration described above. For example, the regulation member 10 may be configured to be shaped similarly to the surface shape, on the radially outer side R2, of the movable member 92 which has the first pressing portion 921 and the second pressing portion 922 and which is used in the pressing process S13 described above. In this case, the end surface, on the radially outer side R2, of a portion corresponding to the first pressing portion 921 and the end portion, on the radially outer side R2, of a portion corresponding to the second pressing portion 922 function as the regulation surface 11. That is, in this case, the regulation surface 11 faces both the joint portion 43 of the first segment conductor 5 and the joint portion 43 of the second segment conductor 6.

Figure 10:
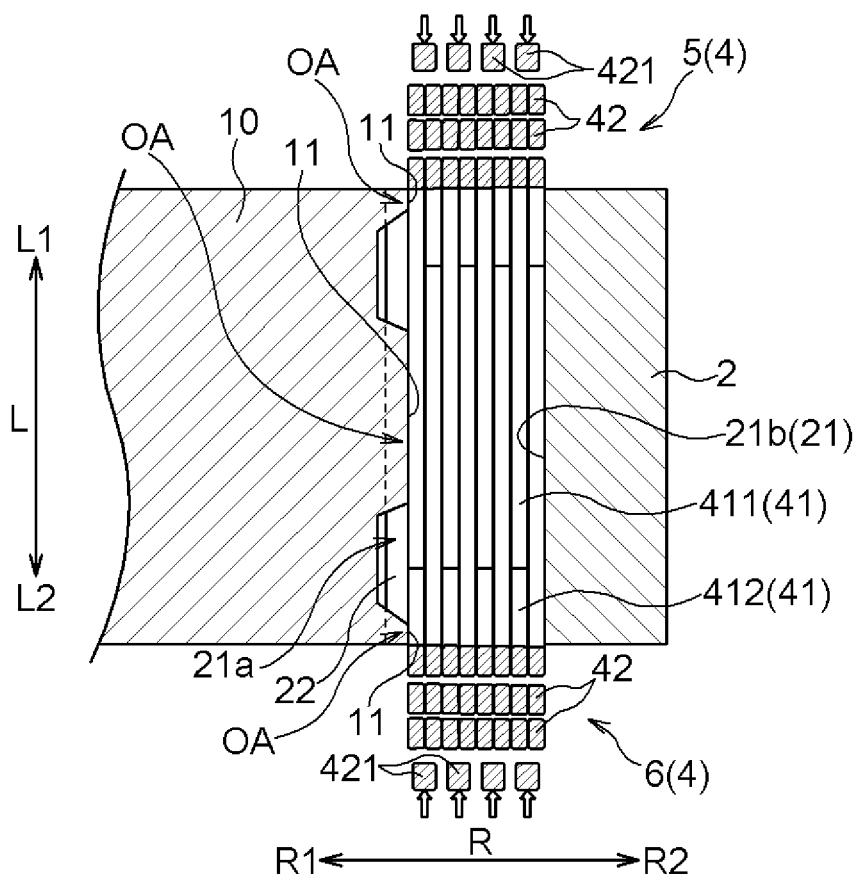
FIG. 10 illustrates a regulation process of the method of manufacturing the rotary electric machine armature according to the third embodiment.

Alternatively, the regulation surface 11 may be shaped as illustrated in FIG. 10, for example. In the example illustrated in FIG. 10, the object region OA is a part of the region, in the axial direction L, of both the conductor side portions 41 of the first segment conductors 5 and the conductor side portions 41 of the second segment conductors 6. Specifically, in the example illustrated in FIG. 10, the object region OA is portions of the conductor side portions 41 of the plurality of segment conductors 4 disposed in the slot 21 excluding portions at which the pair of joint portions 43 to be joined to each other overlap each other as viewed in the radial direction R. Therefore, in the example illustrated in FIG. 10, the regulation surface 11 is formed at three locations in the axial direction L so as to face portions of the conductor side portions 41 of the plurality of segment conductors 4 disposed in the slot 21 at which the pair of joint portions 43 to be joined to each other do not overlap each other as viewed in the radial direction R.

The segment conductors 4 may be pressed by a portion of the movable member 92 corresponding to the regulation surface 11 by applying the shape of the surface, on the radially outer side R2, of the regulation member 10 which includes the regulation surface 11 to the shape of the surface, on the radially outer side R2, of the movable member 92 which is used in the pressing process S13 described above. In the case where the shape of a portion of the movable member 92 corresponding to the regulation surface 11 is similar to the shape of the regulation surface 11 illustrated in FIG. 8, the entire region of the conductor side portions 41 in the axial direction L is pressed, and therefore a uniform pressing force can be applied to the conductor side portions 41. In the case where the shape of a portion of the movable member 92 corresponding to the regulation surface 11 is similar to the shape of the regulation surface 11 illustrated in FIG. 10, on the other hand, the conductive joint material 8 which is disposed between the joint portion 43 of the first segment conductor 5 and the joint portion 43 of the second segment conductor 6 is unlikely to adhere to a portion of the movable member 92 corresponding to the regulation surface 11.

In addition, it is also suitable if the method of manufacturing the stator 1 which includes the regulation process S15 in place of the pressing process S13 as in the present embodiment is performed using the segment conductors 4 which have the facing surfaces 44 which are configured as described above in relation to the first embodiment or the second embodiment.

5. Fourth Embodiment

A rotary electric machine armature according to a fourth embodiment will be described below with reference to FIG. 11. In the present embodiment, the configuration of the slots 21 of the stator core 2 is different from that according to the first embodiment described above and the second embodiment described above. The differences from the first embodiment described above and the second embodiment described above will be mainly described below. The same elements as those in the first embodiment described above and the second embodiment described above will not be particularly described.

In the present embodiment, as illustrated in FIG. 11, the slots 21 are semi-open slots. Specifically, the width of the radially opening portion 21a in the circumferential direction C is smaller than the width, in the circumferential direction C, of a region of the slot 21 in which the conductor side portions 41 are disposed. In other words, projecting portions that project toward both sides in the circumferential direction C are formed at distal end portions 22a of the teeth 22.

A sheet-like insulating member 7 is provided in each of the slots 21 in order to secure electrical insulation between the coil 3 and the stator core 2. Specifically, the insulating member 7 is interposed between the conductor side portions 41 and the inner wall surface of the slot 21.

In the following, for convenience of description, all of the conductor side portions 41 in each of the slots 21 will be referred to as a "conductor side portion group".

In the present embodiment, the insulating member 7 is disposed so as to cover the side surfaces of the conductor side portion group on both sides in the circumferential direction C (surfaces that face the inner wall surfaces of the slot 21 on both sides in the circumferential direction C) and the side surface of the conductor side portion group on the radially outer side R2 (a surface that faces the inner wall surface of the slot 21 on the radially outer side R2). In other words, in the present embodiment, the insulating member 7 is disposed so as to cover all the side surfaces of the conductor side portion group excluding the side surface thereof on the side of the radially opening portion 21a (radially inner side R1). In addition, the insulating member 7 is longer in the axial direction L than the slot 21, although not illustrated. Hence, the insulating member 7 is disposed so as to project in the axial direction L from both end portions of the slot 21 in the axial direction L. Further, in the present example, as illustrated in FIG. 11, the insulating member 7 has portions that extend toward the radially opening portion 21a from portions that contact the side surfaces of the conductor side portion group on both sides in the circumferential direction C. Such portions are eventually folded to be disposed so as to cover the side surface of the conductor side portion group on the side of the radially opening portion 21a (radially inner side R1).

The manufacturing process S1 according to the reference form of the method of manufacturing the stator 1 according to the present embodiment includes the pressing process S13 discussed above. As illustrated in FIG. 11, the pressing process S13 of the manufacturing process S1 according to the present reference form is performed using a pressing device 9 that includes a plurality of movable members 92, the width of which in the circumferential direction C is smaller than that of the radially opening portions 21a. The movable members 92 according to the present reference form are the same as those used in the pressing process S13 discussed above except for the width in the circumferential direction C. In the pressing process S13 according to the present reference form, the movable members 92 are inserted into the radially opening portions 21a from the radially inner side R1. Then, the conductor side portion groups are pressed by the movable members 92 from the radially opening portions 21a toward the radially outer side R2.

The manufacturing process S1 for the stator 1 according to the present embodiment includes a regulation process S15 in place of the pressing process S13. In the regulation process S15 according to the present embodiment, for example, the movable member 92 described above, the width of which in the circumferential direction C is smaller than that of the radially opening portion 21a, is fixed at a position at which the movable member 92 contacts the conductor side portion group, rather than being moved toward the radially outer side R2. Then, the plurality of segment conductors 4 which are disposed in the slot 21 are pressed from both sides in the axial direction L (the first axial side L1 and the second axial side L2).

6. Fifth Embodiment

A fifth embodiment will be described below with reference to FIG. 12. In a reference form of a method of manufacturing the stator 1 according to the present embodiment, the configuration of the movable member 92 is different from that according to the reference form of the method of manufacturing the stator 1 according to the fourth embodiment described above. The differences from the reference form of the method of manufacturing the stator 1 according to the fourth embodiment described above will be mainly described below. The same elements as those in the reference form of the method of manufacturing the stator 1 according to the fourth embodiment described above will not be particularly described.

As illustrated in FIG. 12, the pressing process S13 according to the present reference form is performed using a pressing device 9 that includes a plurality of movable members 92 that each have a narrow portion 92b and a wide portion 92c. The movable members 92 according to the present reference form each have the narrow portion 92b and the wide portion 92c. The movable members 92 are otherwise the same in configuration as those used in the pressing process S13 discussed above. The width of the narrow portion 92b in the circumferential direction C is smaller than the width of the radially opening portion 21a in the circumferential direction C. The width of the wide portion 92c in the circumferential direction C is larger than the width of the radially opening portion 21a in the circumferential direction C, and smaller than the width, in the circumferential direction C, of a region of the slot 21 in which the conductor side portions 41 are disposed. In addition, the length of the wide portion 92c in the radial direction R is less than the distance between the conductor side portion group and the radially opening portion 21a (the projecting portions which are formed at the distal end portions 22a of the teeth 22 to project in the circumferential direction C). The wide portion 92c is disposed at an end portion of the narrow portion 92b on the radially outer side R2. The wide portion 92c has a shape that matches the space between the radially opening portion 21a and the conductor side portion group in the slot 21.

In the pressing process S13 according to the present reference form, the movable members 92 are inserted into the slots 21 along the axial direction L such that the narrow portion 92b is positioned in the radially opening portion 21a and the wide portion 92c is positioned in the space between the radially opening portion 21a and the conductor side portion group in the slot 21. Then, the conductor side portion groups are pressed by the movable members 92 toward the radially outer side R2. In this event, in the present example, as illustrated in FIG. 12, portions of the insulating member 7 positioned between the radially opening portion 21a and the conductor side portion group extend along portions of the inner wall surfaces of the slot 21 in the circumferential direction C not faced by the conductor side portion group.

Figure 13:
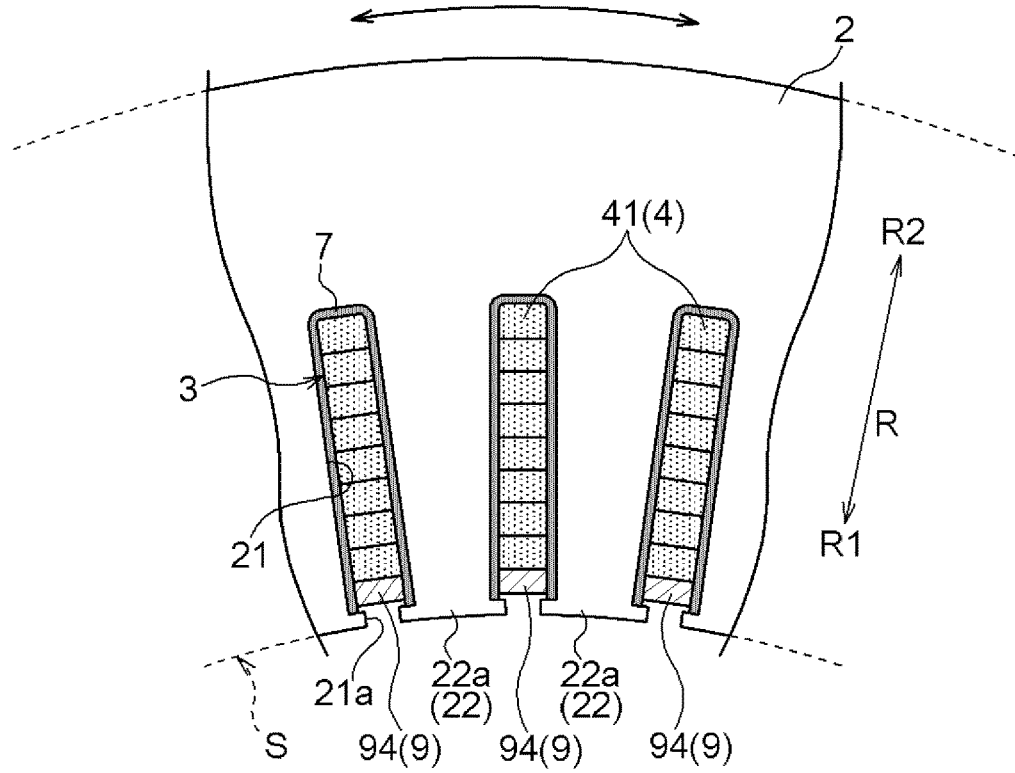
FIG. 13 illustrates a regulation process of the method of manufacturing the rotary electric machine armature according to the fifth embodiment.

In the pressing process S13 according to the present reference form, as illustrated in FIG. 13, a pressing device 9 that includes a plurality of inner pressing members 94 may be used in place of the pressing device 9 which includes the plurality of movable members 92 discussed above. The shape of a portion of the inner pressing member 94 to be inserted into the slot 21 is similar to the shape of the movable member 92 discussed above from which the narrow portion 92b has been removed and which includes only the wide portion 92c. The inner pressing member 94 is longer in the axial direction L than the stator core 2. The inner pressing member 94 is inserted into the space between the radially opening portion 21a and the conductor side portion group in the slot 21 along the axial direction L. Consequently, the inner pressing member 94 is disposed such that both end portions thereof in the axial direction L project toward both sides in the axial direction L (the first axial side L1 and the second axial side L2) from the stator core 2. The inner pressing member 94 is moved toward the radially outer side R2 with both end portions of the inner pressing member 94 in the axial direction L grasped by a grasping device (not illustrated). In this way, the conductor side portion groups are pressed by the inner pressing members 94 toward the radially outer side R2 without passing through the radially opening portions 21a. Such a pressing device 9 does not include the fixed member 91 and the insertion member 93 (see FIG. 7) discussed above, and includes the plurality of inner pressing members 94 and the grasping device. Also in the present reference form, the pressing device 9 which includes the plurality of movable members 92, the width of which in the circumferential direction C is smaller than that of the radially opening portions 21a, may be used as in the reference form of the method of manufacturing the stator 1 according to the fourth embodiment described above.

The manufacturing process S1 for the stator 1 according to the present embodiment includes a regulation process S15 in place of the pressing process S13. In the regulation process S15 according to the present embodiment, for example, the movable member 92 described above, which has the narrow portion 92b and the wide portion 92c, or the inner pressing member 94 described above is fixed at a position at which the movable member 92 or the inner pressing member 94 contacts the conductor side portion group, rather than being moved toward the radially outer side R2. Then, the plurality of segment conductors 4 which are disposed in the slot 21 are pressed from both sides in the axial direction L (the first axial side L1 and the second axial side L2).

7. Sixth Embodiment

A sixth embodiment will be described below with reference to FIG. 14. In a reference form of a method of manufacturing the stator 1 according to the present embodiment, the state of the insulating member 7 during the pressing process S13 is different from that according to the reference form of the method of manufacturing the stator 1 according to the fourth embodiment described above. The differences from the reference form of the method of manufacturing the stator 1 according to the fourth embodiment described above will be mainly described below. The same elements as those in the reference form of the method of manufacturing the stator 1 according to the fourth embodiment described above will not be particularly described.

Figure 14:
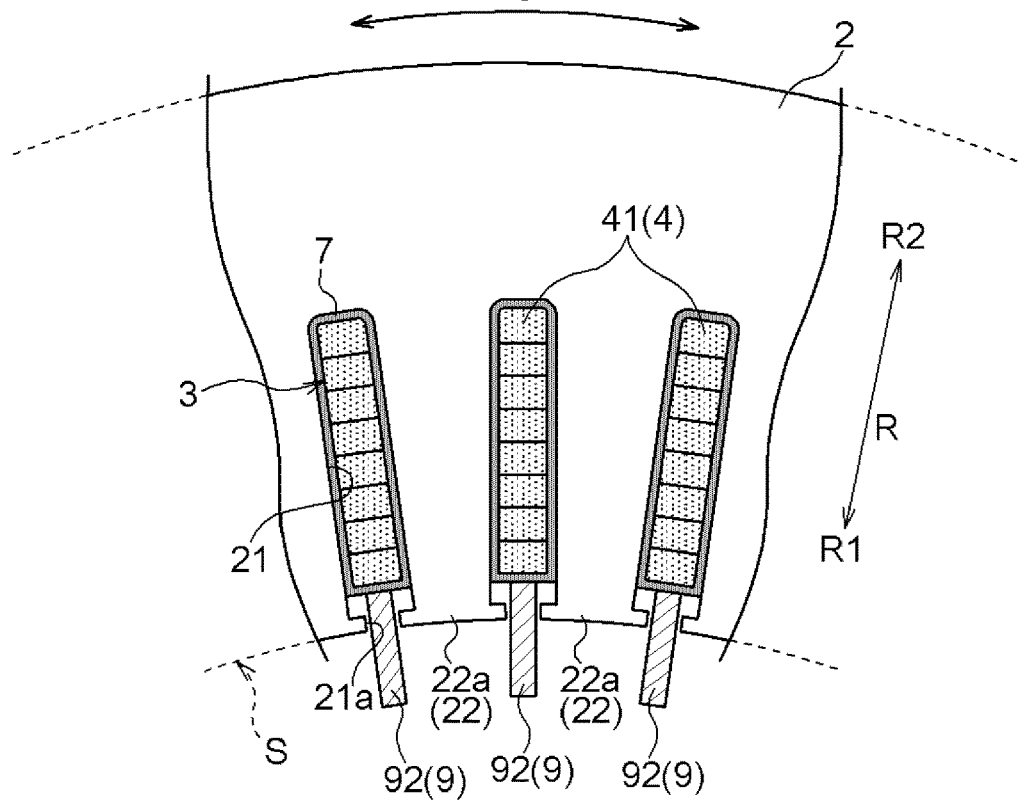
FIG. 14 illustrates a regulation process of a method of manufacturing a rotary electric machine armature according to a sixth embodiment.

In the present reference form, as illustrated in FIG. 14, the insulating member 7 is disposed so as to cover all the side surfaces of the conductor side portion group. Here, a portion of the insulating member 7 that covers the side surface of the conductor side portion group on the side of the radially opening portion 21a is constituted by folding portions of the insulating member 7 that extend from portions that contact the side surfaces of the conductor side portion group on both sides in the circumferential direction C toward the radially opening portion 21a in a direction along the side surface of the conductor side portion group on the side of the radially opening portion 21a. In this portion, portions of the insulating member 7 on both sides in the circumferential direction C may be disposed so as to overlap each other, or the end portions of the insulating member 7 on both sides in the circumferential direction C may be disposed so as to contact each other. In the pressing process S13 according to the present reference form, as illustrated in FIG. 11, the pressing device 9 which includes the plurality of movable members 92 according to the reference form of the method of manufacturing the stator 1 according to the fourth embodiment described above is used. The pressing device 9 described in relation to the reference form of the method of manufacturing the stator 1 according to the fifth embodiment described above may also be used. The manufacturing process S1 for the stator 1 according to the present embodiment also includes a regulation process S15 in place of the pressing process S13.

8. Seventh Embodiment

Figure 15:
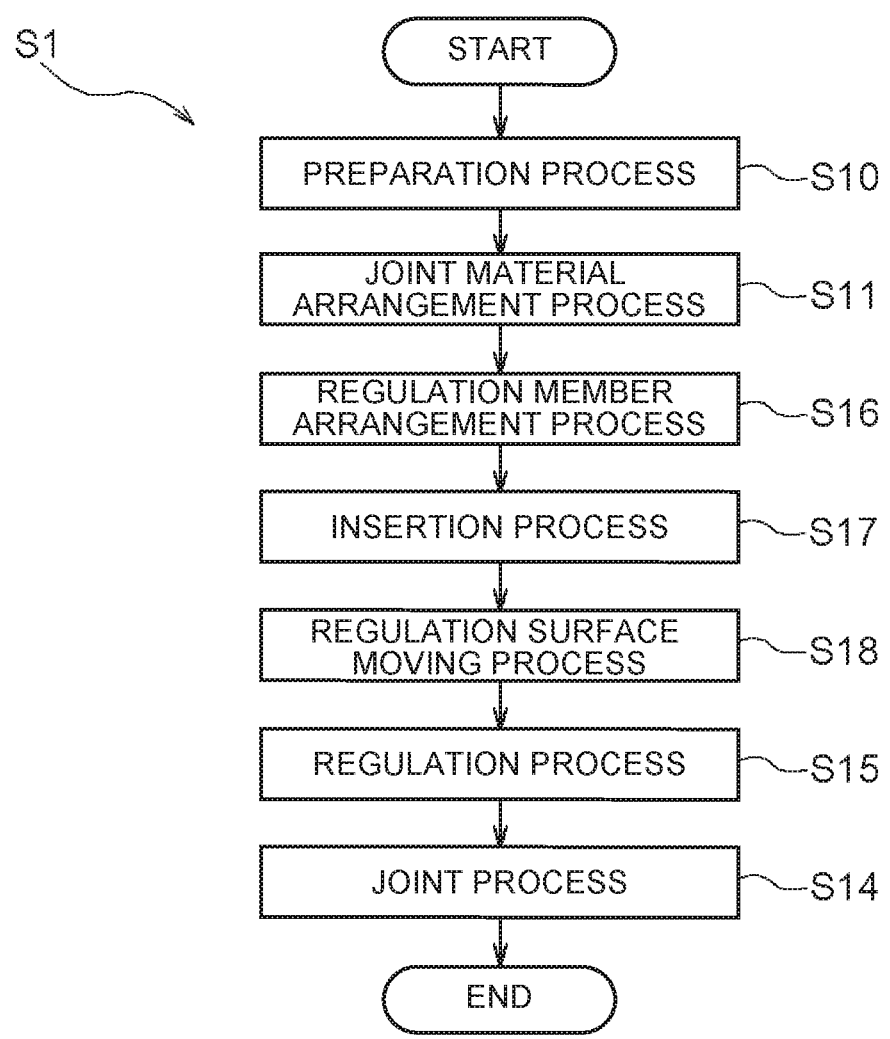
FIG. 15 is a flowchart illustrating a method of manufacturing a rotary electric machine armature according to a seventh embodiment.

A seventh embodiment will be described below with reference to FIGS. 15 to 17. As illustrated in FIG. 15, the manufacturing process S1 according to the present embodiment includes a preparation process S10, a joint material arrangement process S11, a regulation member arrangement process S16, an insertion process S17, a regulation surface moving process S18, a regulation process S15, and a joint process S14. That is, the manufacturing process S1 according to the present embodiment is different from the manufacturing process S1 (see FIG. 9) according to the third embodiment described above in including the regulation member arrangement process S16 and the regulation surface moving process S18 and including the insertion process S17 in place of the arrangement process S12 discussed above. The differences from the third embodiment described above will be mainly described below. The same elements as those in the third embodiment described above will not be particularly described.

In the regulation member arrangement process S16, the regulation member 10 which regulates movement of the conductor side portions 41 in the radial direction R through the regulation surface 11 is disposed. In the regulation member arrangement process S16, as illustrated in FIG. 16, the regulation surface 11 of the regulation member 10 is disposed in accordance with the position, in the radial direction R, of the conductor side portions 41 positioned most on the side of the radially opening portion 21a (radially inner side R1).

Here, the thickness of one conductor side portion 41 in the radial direction R is defined as a conductor thickness T1, and a length obtained by multiplying the number (eight in the illustrated example) of the conductor side portions 41 which are arranged in the radial direction R in the slot 21 by the conductor thickness T1 is defined as an in-slot conductor thickness T2.

In the regulation member arrangement process S16 according to the present embodiment, the regulation surface 11 is located away from the inner wall surface 21b of the slot 21 on the opposite side (radially outer side R2) from the side of the radially opening portion 21a toward the radially opening portion 21a (radially inner side R1) by the in-slot conductor thickness T2 or more. Further, the regulation surface 11 is disposed at a position housed in the slot 21. Specifically, the regulation surface 11 is located away from the inner wall surface 21b by a distance that is less than the slot depth Ds which is the length of the slot 21 in the radial direction R. In the illustrated example, the regulation surface 11 is located away from the inner wall surface 21b toward the radially opening portion 21a (radially inner side R1) by a distance obtained by adding a prescribed clearance to the in-slot conductor thickness T2. That is, the distance from the inner wall surface 21b to the regulation surface 11 is more than the in-slot conductor thickness T2 by the clearance. The distance from the inner wall surface 21b to the regulation surface 11 may be equal to the in-slot conductor thickness T2 by setting the clearance to zero.

Figure 16:
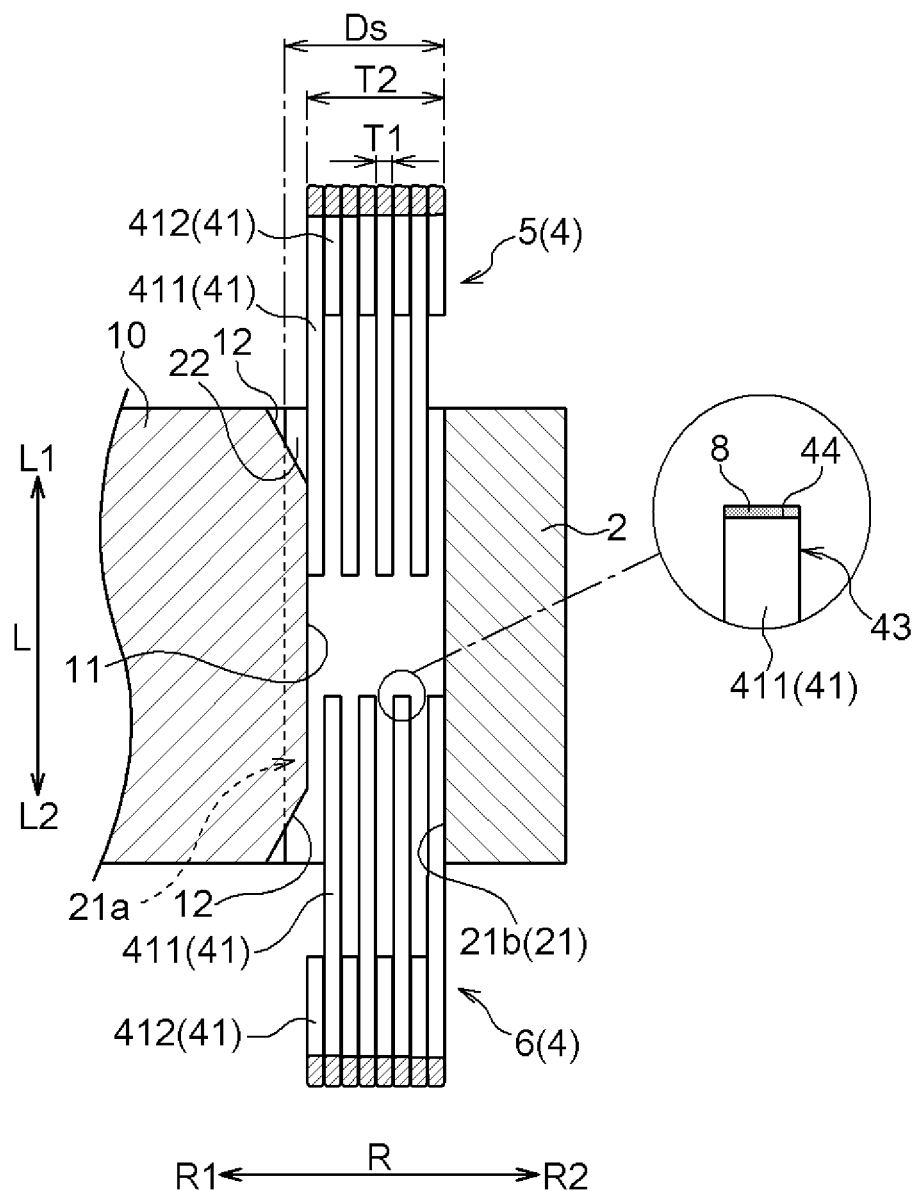
FIG. 16 illustrates an insertion process according to the seventh embodiment.

In the present embodiment, as illustrated in FIG. 16, the regulation surface 11 has a guide inclined surface 12 on both sides in the axial direction L (the first axial side L1 and the second axial side L2) of the regulation surface 11. The pair of guide inclined surfaces 12 are formed so as to be directed toward the radially opening portion 21a (radially inner side R1) as the guide inclined surfaces 12 extend away from each other. That is, the pair of guide inclined surfaces 12 are formed so as to be spaced more from the inner wall surface 21b of the slot 21 as the guide inclined surfaces 12 extend away from each other. In the present embodiment, the guide inclined surfaces 12 are formed in parallel with the circumferential direction C.

In the insertion process S17, which is performed after the regulation member arrangement process S16, at least either the conductor side portions 41 of the first segment conductor 5 and the conductor side portions 41 of the second segment conductor 6 are inserted into the slots 21 such that the facing surface 44 of one of the joint portions 43 of the first segment conductor 5 and the facing surface 44 of one of the joint portions 43 of the second segment conductor 6 face each other. In the insertion process S17, movement of the conductor side portions 41 in the radial direction R is regulated by the regulation surface 11 of the regulation member 10 until the facing surface 44 of one of the joint portions 43 of the first segment conductor 5 and the facing surface 44 of one of the joint portions 43 of the second segment conductor 6 face each other. The insertion process S17 is one form of the arrangement process S12 discussed above. In the insertion process S17 according to the present embodiment, as illustrated in FIG. 16, the conductor side portions 41 of the plurality of segment conductors 4 are inserted between the regulation surface 11 of the regulation member 10 and the inner wall surface 21b of the slot 21. At this time, in the present embodiment, the distal end portions of the conductor side portions 41 are guided toward the inside of the slot 21 by the guide inclined surfaces 12, and therefore the conductor side portions 41 can be easily inserted between the regulation surface 11 and the inner wall surface 21b.

In the insertion process S17 according to the present embodiment, the plurality of first segment conductors 5 and the plurality of second segment conductors 6 are inserted into the slots 21 from both sides in the axial direction L (the first axial side L1 and the second axial side L2) such that the facing surface 44 of the first conductor side portion 411 of the first segment conductor 5 and the facing surface 44 of the second conductor side portion 412 of the second segment conductor 6 face each other and the facing surface 44 of the second conductor side portion 412 of the first segment conductor 5 and the facing surface 44 of the first conductor side portion 411 of a different second segment conductor 6 face each other in each of the slots 21.

Figure 17:
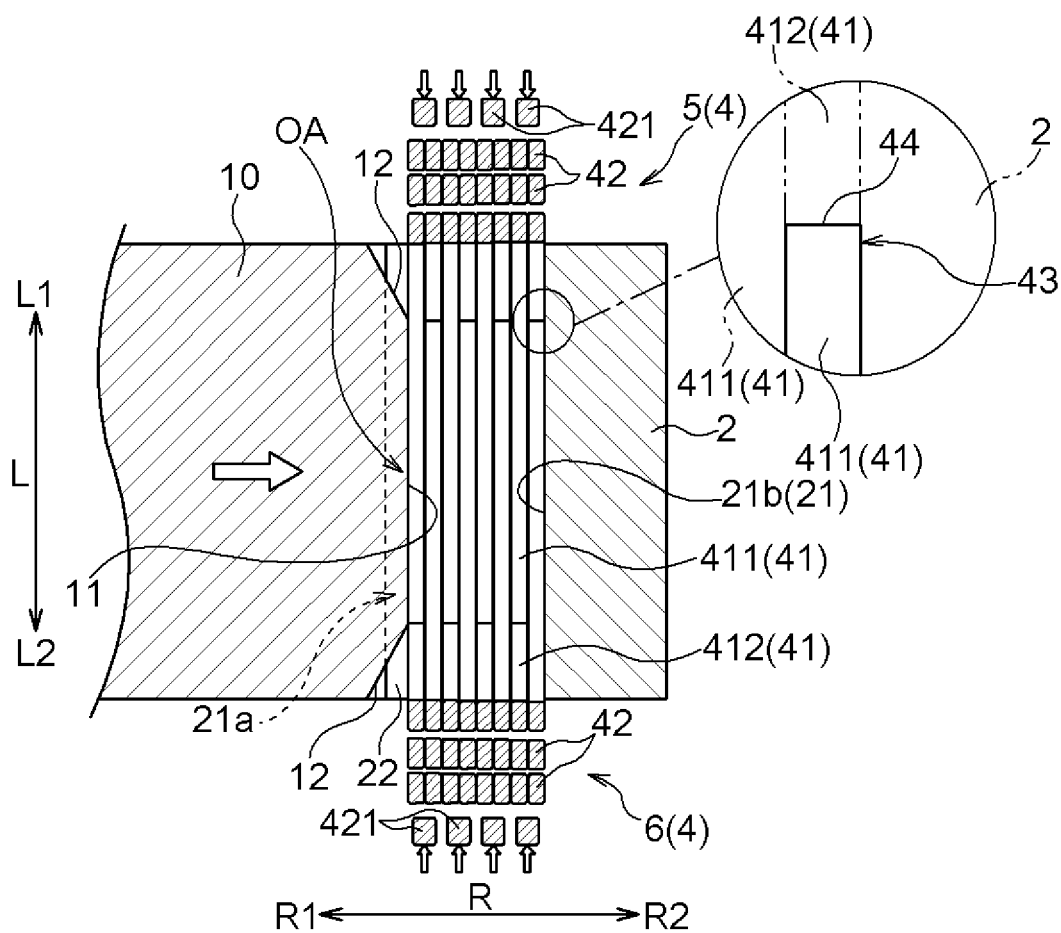
FIG. 17 illustrates a regulation surface moving process.

In the regulation surface moving process S18, as illustrated in FIG. 17, the regulation surface 11 is moved toward the opposite side (radially outer side R2) from the side of the radially opening portion 21a in the radial direction R. In the present embodiment, the regulation surface 11 is formed on the end surface of the regulation member 10 on the radially outer side R2, and therefore the regulation surface 11 is moved toward the opposite side (radially outer side R2) from the radially opening portion 21a in the radial direction R by moving the regulation member 10 toward the opposite side (radially outer side R2) from the radially opening portion 21a in the radial direction R. The configuration of a moving device that moves the regulation member 10 in the radial direction R is not specifically limited. The moving device may be similar to a mechanism that moves the movable members 92 of the pressing device 9, or other moving devices known in the art may also be adopted.

As illustrated in FIG. 15, the regulation surface moving process S18 is performed after the insertion process S17 and before the joint process S14. In the present embodiment, the regulation surface moving process S18 follows the insertion process S17, and the regulation process S15 follows the regulation surface moving process S18.

In the illustrated example, as discussed above, the distance from the inner wall surface 21b to the regulation surface 11 is a distance obtained by adding the prescribed clearance to the in-slot conductor thickness T2. Therefore, when the regulation surface 11 is moved toward the opposite side (radially outer side R2) from the side of the radially opening portion 21a in the radial direction R, the regulation surface 11 contacts the surfaces of the segment conductors 4 on the side of the radially opening portion 21a with the clearance described above eliminated. When the regulation surface 11 is further moved, the regulation surface 11 presses the conductor side portions 41 of the plurality of segment conductors 4 toward the radially outer side R2. In this case, the regulation surface moving process S18 and the regulation process S15 function as the pressing process S13 discussed above.

The regulation member 10 which is disposed in the regulation member arrangement process S16 may be the regulation member 10 in a different shape such as that illustrated in FIG. 10 discussed above. In addition, the regulation member 10 may be shaped similarly to the movable member 92 illustrated in FIG. 7.

Figure 18:
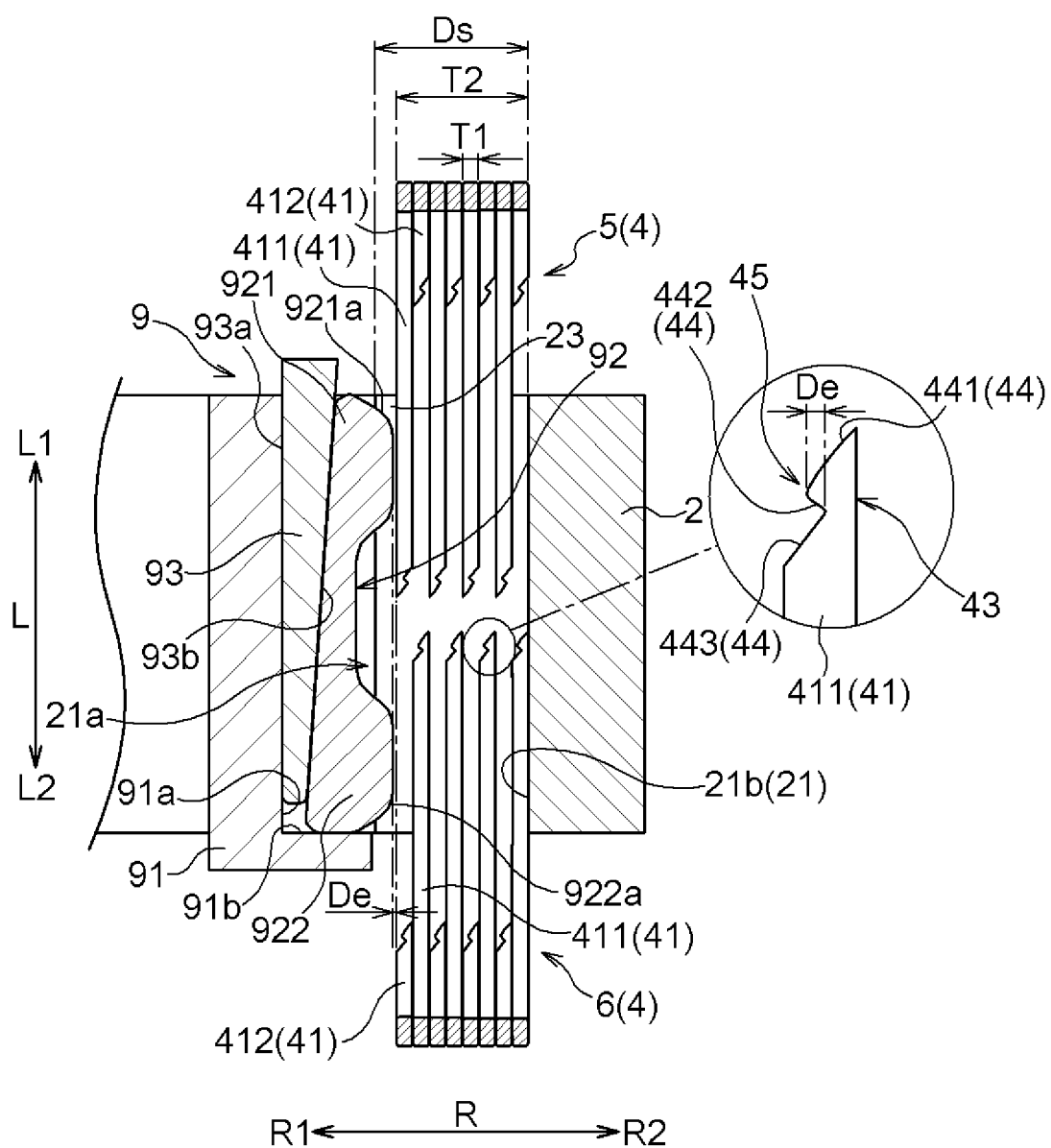
FIG. 18 illustrates an insertion process according to a second reference form.

9. Second Reference Form of Method of Manufacturing Rotary Electric Machine Armature A second reference form of a method of manufacturing a rotary electric machine armature will be described below with reference to FIG. 18. The present reference form is different from the seventh embodiment described above in that the pressing device 9 is disposed in place of the regulation member 10 in the regulation member arrangement process S16 as illustrated in FIG. 18. In the present reference form, the end surfaces, on the radially outer side R2, of the first pressing portion 921 and the second pressing portion 922 of the movable member 92 each function as the regulation surface 11.

As illustrated in FIG. 18, the segment conductors 4 according to the present reference form are similar to those according to the second embodiment described above (see FIG. 4). Therefore, the facing surface 44 of the segment conductor 4 according to the present reference form includes a first inclined surface 441, a second inclined surface 442, and a third inclined surface 443. As discussed above, the first inclined surface 441 and the second inclined surface 442 form a projecting portion that projects in the radial direction R. Hence, the joint portion 43 of the first segment conductor 5 and the joint portion 43 of the second segment conductor 6 have respective radially recessed/projecting portions 45 to be meshed with each other in the radial direction R. In the present reference form, a meshing depth De which is the depth of meshing of the radially recessed/projection portion 45 is the length of the second inclined surface 442 in the radial direction R.

In the regulation member arrangement process S16 according to the present reference form, the regulation surface 11 is located away from the inner wall surface 21b of the slot 21 on the opposite side (radially outer side R2) from the side of the radially opening portion 21a toward the radially opening portion 21a (radially inner side R1) by a length obtained by adding the meshing depth De to the in-slot conductor thickness T2 or more. Further, the regulation surface 11 is disposed at a position housed in the slot 21. Specifically, the regulation surface 11 is located away from the inner wall surface 21b by a distance that is less than the slot depth Ds which is the length of the slot 21 in the radial direction R.

In the illustrated example, the regulation surface 11 is located away from the inner wall surface 21b toward the radially opening portion 21a (radially inner side R1) by a distance that is identical to the length obtained by adding the meshing depth De to the in-slot conductor thickness T2. That is, the distance from the inner wall surface 21b to the regulation surface 11 is equal to the length obtained by adding the meshing depth De to the in-slot conductor thickness T2. In the illustrated example, the conductor side portions 41 positioned most on the opposite side (radially outer side R2) from the side of the radially opening portion 21a contact the inner wall surface 21b of the slot 21. Therefore, the distance between the end surfaces of the first pressing portion 921 and the second pressing portion 922 on the radially outer side R2 and the side surfaces, on the radially inner side R1, of the conductor side portions 41 positioned most on the side of the radially opening portion 21a (radially inner side R1) is equal to the meshing depth De. That is, a clearance corresponding to the meshing depth De is formed between the first pressing portion 921 and the second pressing portion 922 and the conductor side portions 41 positioned most on the side of the radially opening portion 21a (radially inner side R1).

In the regulation surface moving process S18 according to the present reference form, as in the pressing process S13 discussed above, the movable member 92 is moved toward the radially outer side R2. Consequently, the first pressing portion 921 and the second pressing portion 922 approach the conductor side portions 41 positioned most on the side of the radially opening portion 21a (radially inner side R1), which reduces the clearance therebetween. In the case where the movable member 92 is further moved from a state in which the clearance has been eliminated, the conductor side portions 41 of the plurality of segment conductors 4 are pressed toward the radially outer side R2. In this way, a transition can be made smoothly from the regulation surface moving process S18 to the pressing process S19 (see FIG. 7). The regulation surface moving process S18 may be ended in a state in which a clearance that is less than the meshing depth De is formed, rather than moving the movable member 92 until the clearance described above is eliminated in the regulation surface moving process S18. In this case, the regulation process S15 is performed in place of the pressing process S19 after the regulation surface moving process S18.

In addition, as discussed above, the first pressing portion 921 and the second pressing portion 922 are formed so as to project toward the radially outer side R2 with respect to portions on both sides in the axial direction L. Therefore, as illustrated in FIG. 18, a first guide inclined surface 921a and a second guide inclined surface 922a are formed on both sides in the axial direction L (the first axial side L1 and the second axial side L2) of the movable member 92. Specifically, the first guide inclined surface 921a is formed on the first axial side L1 of the first pressing portion 921, and the second guide inclined surface 922a is formed on the second axial side L2 of the second pressing portion 922. The first guide inclined surface 921a and the second guide inclined surface 922a are formed so as to be directed toward the radially opening portion 21a (radially inner side R1) as the first guide inclined surface 921a and the second guide inclined surface 922a extend away from each other. The first guide inclined surface 921a and the second guide inclined surface 922a have a function that is similar to that of the pair of guide inclined surfaces 12 of the regulation member 10 according to the seventh embodiment described above.

10. Other Embodiments (1) In the embodiments described above, the facing surfaces 44 which are each a single inclined surface are formed at the joint portions 43 of the conductor side portions 41 (first embodiment), or the facing surfaces 44 which each include the first inclined surface 441, the second inclined surface 442, and the third inclined surface 443 are formed at the joint portions 43 of the conductor side portions 41 (second embodiment), for example. However, the facing surfaces 44 can also be shaped differently from those according to the embodiments described above, as described below.

For example, the facing surfaces 44 may be shaped as illustrated in FIG. 19. The facing surfaces 44 illustrated in FIG. 19 each include a first orthogonal surface 445 and a second orthogonal surface 447 that extend along the radial direction R, that is, a direction that is orthogonal to the extension direction of the conductor side portions 41, and a parallel surface 446 that extends along the axial direction L, that is, a direction that is parallel to the extension direction of the conductor side portions 41. The first orthogonal surface 445, the parallel surface 446, and the second orthogonal surface 447 are disposed in this order from the distal end portion toward the base end portion of the conductor side portion 41 in the axial direction L, and formed to be continuous with adjacent surfaces. In the present embodiment, the facing surface 44 of the first conductor side portion 411 does not have a surface that faces the radially inner side R1 and therefore is constituted of only a surface that faces the radially outer side R2, and the facing surface 44 of the second conductor side portion 412 does not have a surface that faces the radially outer side R2 and therefore is constituted of only a surface that faces the radially inner side R1. Also in the present embodiment, the facing surfaces 44 which face each other have the same shape as each other, and are disposed in parallel with each other.

Alternatively, as illustrated in FIG. 20, the facing surfaces 44 which face each other may be shaped differently from each other. Also in this case, it is suitable if the pair of facing surfaces 44 which face each other are formed with a projection and a recess corresponding to each other, and the projection and the recess are engaged with each other to have a positioning function and a function of regulating separation in the axial direction L. In the example illustrated in FIG. 20, the facing surfaces 44 are formed with a portion that projects in the radial direction R or a portion dented in the radial direction R. The pair of facing surfaces 44 configured in this manner also function as the radially recessed/projecting portions 45, as with those according to the second reference form described above (see FIG. 18).

(2) In the embodiments described above, the coil 3 includes a plurality of segment conductors 4 configured to be wound around the stator core 2 by lap winding. However, the present disclosure is not limited thereto. For example, the coil 3 may include a plurality of segment conductors 4 configured to be wound around the stator core 2 by wave winding.

(3) In the embodiments described above, the cross-sectional shape of the segment conductors 4 taken along a plane that is orthogonal to the extension direction is rectangular. However, the present disclosure is not limited thereto. The cross-sectional shape of the linear conductors may be a shape other than a rectangular shape. For example, the cross-sectional shape of the linear conductors may be a circular shape or an elliptical shape, and may be a polygonal shape such as a triangular shape, a pentagonal shape, or a shape with six or more sides.

(4) In the embodiments described above, the slots 21 extend in parallel with the axial direction L. However, the present disclosure is not limited thereto. It is also suitable if the slots 21 extend as inclined with respect to the axial direction L, either entirely or partially. Also in this case, the slots 21 are considered to extend in the axial direction L.

(5) In the embodiments described above, in the joint material arrangement process S11, the conductive joint material 8 is disposed on at least one of the facing surfaces 44, which face each other, of the pair of segment conductors 4, and the pair of joint portions 43 (facing surfaces 44) are joined to each other using the conductive joint material 8. However, the present disclosure is not limited thereto. For example, the pair of joint portions 43 (facing surfaces 44) may be joined to each other by welding etc. without using a joint material.

Figure 21:
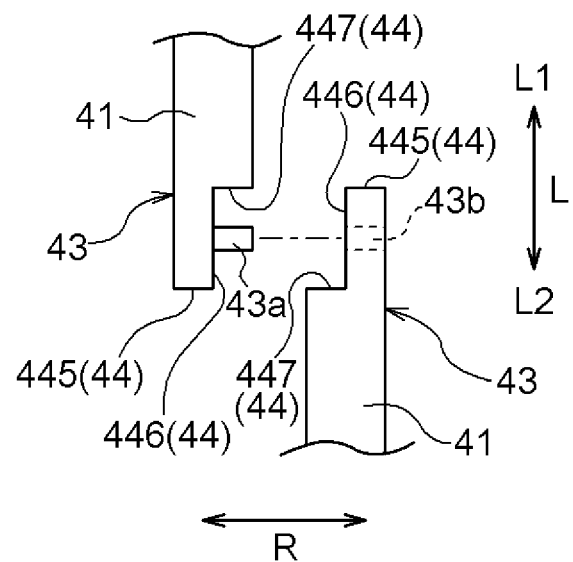
FIG. 21 illustrates joint portions of segment conductors shaped to be fitted with each other in the radial direction.

In addition, the joint portion 43 of the first segment conductor 5 and the joint portion 43 of the second segment conductor 6 may be shaped to be fitted with each other. An example illustrated in FIG. 21 is a reference example in which the joint portion 43 of the first segment conductor 5 and the joint portion 43 of the second segment conductor 6 are shaped to be fitted with each other in the radial direction R. In the example illustrated in FIG. 21, one of the pair of facing surfaces 44 illustrated in FIG. 19 is provided with a radially fitting projecting portion 43a, and the other is provided with a radially fitting hole portion 43b. The radially fitting projecting portion 43a projects in the radial direction R from the parallel surface 446 of one of the facing surfaces 44. The radially fitting hole portion 43b opens in the parallel surface 446 of the other facing surface 44 so as to extend in the radial direction R into the joint portion 43 which has the other facing surface 44. In such a configuration provided with the radially fitting projecting portion 43a and the radially fitting hole portion 43b, the radially fitting projecting portion 43a is inserted into the radially fitting hole portion 43b by pressing the pair of conductor side portions 41, which are provided with the radially fitting projecting portion 43a and the radially fitting hole portion 43b, in the radial direction R with the radially fitting projecting portion 43a and the radially fitting hole portion 43b facing each other in the pressing process S13. Consequently, the radially fitting projecting portion 43a and the radially fitting hole portion 43b are fitted with each other, and the joint portion 43 of the first segment conductor 5 and the joint portion 43 of the second segment conductor 6 are joined to each other. The length of the radially fitting projecting portion 43a in the radial direction R is set to be equal to or less than the length of the radially fitting hole portion 43b in the radial direction R. In the example illustrated in FIG. 21, in addition, the radially fitting hole portion 43b penetrates the joint portion 43 in the radial direction R. The shape of the radially fitting projecting portion 43a and the radially fitting hole portion 43b is not specifically limited. It is only necessary that the radially fitting projecting portion 43a and the radially fitting hole portion 43b should be shaped such that the former can be inserted into the latter in the radial direction R. Examples of the shape of the radially fitting projecting portion 43a and the radially fitting hole portion 43b include a circular column shape and a rectangular column shape.

Figure 22:
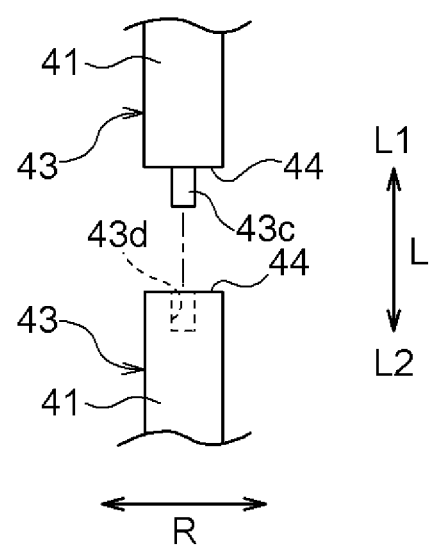
FIG. 22 illustrates joint portions of segment conductors shaped to be fitted with each other in the axial direction.

The joint portion 43 of the first segment conductor 5 and the joint portion 43 of the second segment conductor 6 may be shaped to be fitted with each other in the axial direction L. In the example illustrated in FIG. 22, one of the pair of facing surfaces 44, which are formed as flat surfaces that extend along the radial direction R, is provided with an axially fitting projecting portion 43c, and the other is provided with an axially fitting hole portion 43d. The axially fitting projecting portion 43c projects in the radial direction R from one facing surface 44. The axially fitting hole portion 43d opens in the other facing surface 44 so as to extend in the axial direction L into the joint portion 43 which has the other facing surface 44. In such a configuration provided with the axially fitting projecting portion 43c and the axially fitting hole portion 43d, as in the third embodiment described above (see FIG. 8) and the seventh embodiment described above (see FIG. 17), the axially fitting projecting portion 43c is inserted into the axially fitting hole portion 43d by pressing the plurality of segment conductors 4, which are provided with the axially fitting projecting portion 43c and the axially fitting hole portion 43d, in the axial direction L with the axially fitting projecting portion 43c and the axially fitting hole portion 43d facing each other in the joint process S14. Consequently, the axially fitting projecting portion 43c and the axially fitting hole portion 43d are fitted with each other, and the joint portion 43 of the first segment conductor 5 and the joint portion 43 of the second segment conductor 6 are joined to each other. The length of the axially fitting projecting portion 43c in the axial direction L is set to be equal to or less than the length of the axially fitting hole portion 43d in the axial direction L. The shape of the axially fitting projecting portion 43c and the axially fitting hole portion 43d is not specifically limited. It is only necessary that the axially fitting projecting portion 43c and the axially fitting hole portion 43d should be shaped such that the former can be inserted into the latter in the axial direction L. Examples of the shape of the axially fitting projecting portion 43c and the axially fitting hole portion 43d include a circular column shape and a rectangular column shape.

The conductive joint material 8 may be disposed between the joint portions 43 of the pair of segment conductors 4 also in the case where the joint portions 43 are shaped to be fitted with each other in the radial direction R or the axial direction L as described above.

(6) In the embodiments described above, the segment conductors 4 are formed in a U-shape as viewed in the radial direction R, and each have a pair of conductor side portions 41 and a crossover portion 42 that connects between the pair of conductor side portions 41. However, the shape of the segment conductors 4 is not limited thereto. For example, the segment conductors 4 may be formed in a J-shape, and each have one conductor side portion 41 and a crossover portion 42 connected to the conductor side portion 41.

(7) In the embodiments described above, the rotary electric machine armature is constituted as the stator 1 for a rotary electric machine of an inner rotor type. However, the present disclosure is not limited thereto. The rotary electric machine armature may be constituted as a stator 1 for a rotary electric machine of an outer rotor type. In this case, it is suitable if the radially opening portions 21a of the slots 21 of the stator core 2 open toward the radially outer side R2.

(8) In the embodiments described above, the joint portions 43 of the first segment conductors 5 and the joint portions 43 of the second segment conductors 6 are joined to each other in the slot 21. However, the joint portions 43 of the first segment conductors 5 and the joint portions 43 of the second segment conductors 6 may be joined to each other outside the slot 21 as described below.

Figure 23:
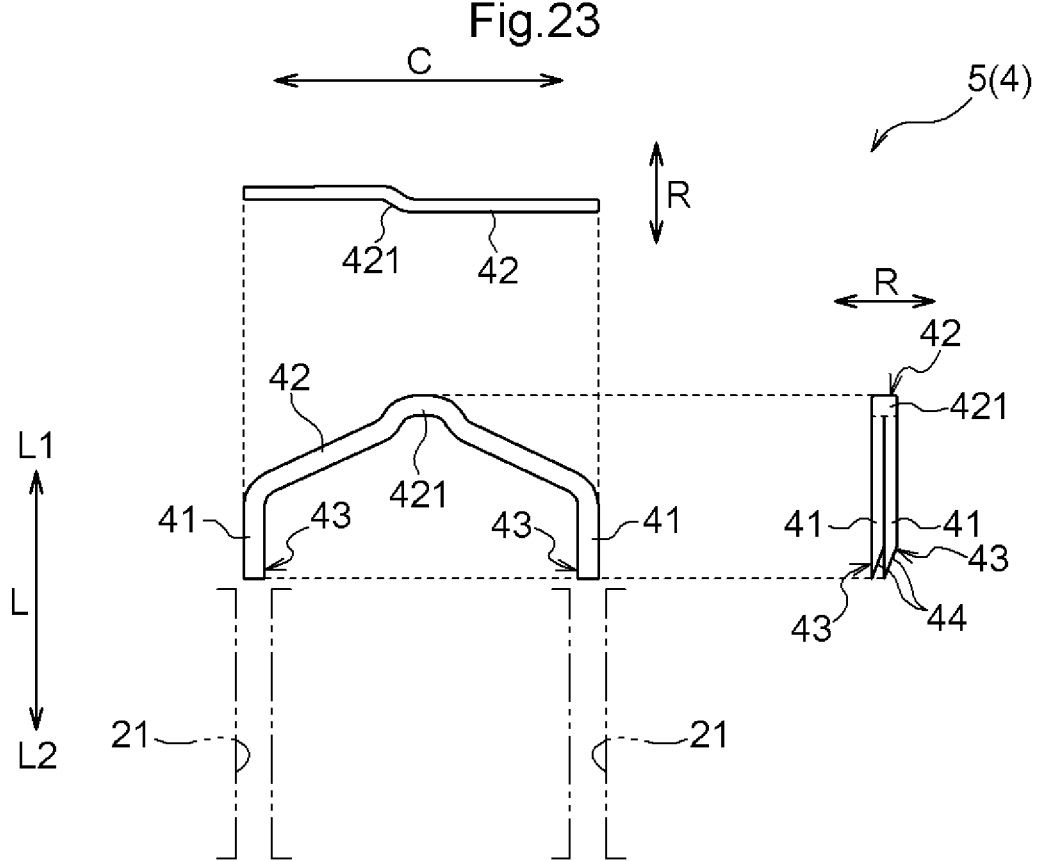
FIG. 23 illustrates one of a pair of segment conductors according to a different embodiment.
Figure 24:
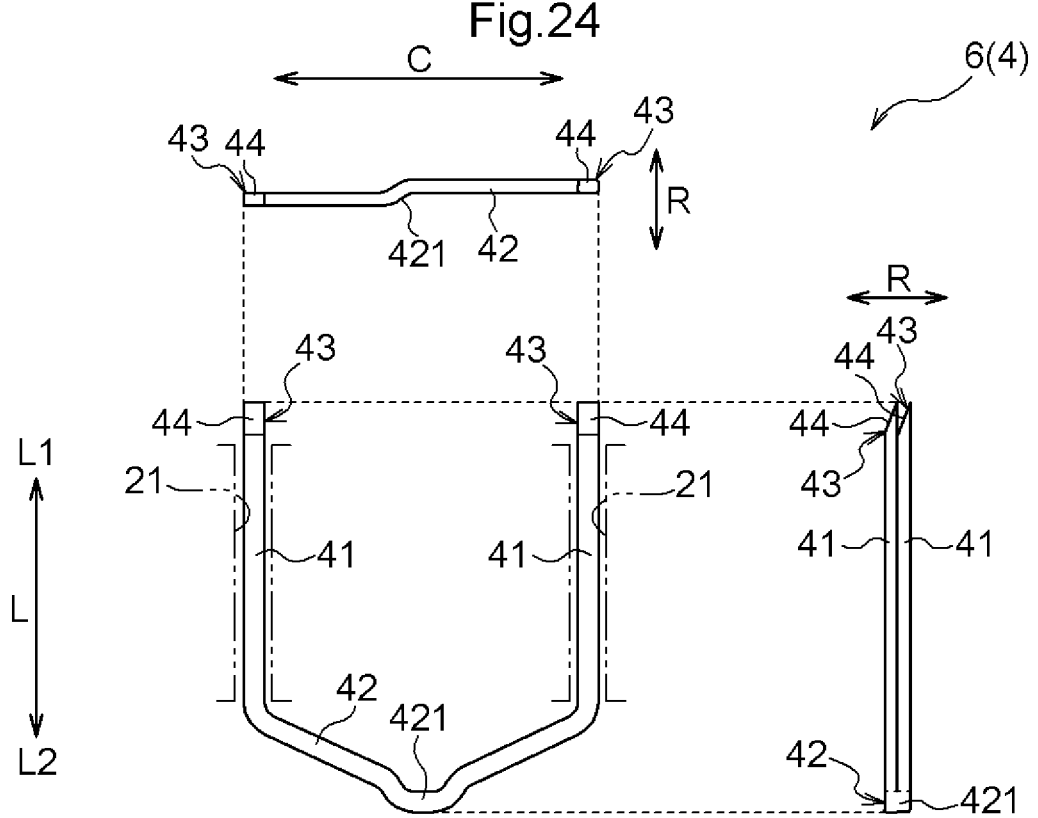
FIG. 24 illustrates the other of the pair of segment conductors according to the different embodiment.

In the example illustrated in FIGS. 23 and 24, the pair of conductor side portions 41 of the first segment conductor 5 have the same length in the axial direction L, and the pair of conductor side portions 41 of the second segment conductor 6 have the same length in the axial direction L. The conductor side portions 41 of the second segment conductor 6 are longer in the axial direction L than the conductor side portions 41 of the first segment conductor 5. The conductor side portions 41 of the second segment conductor 6 are longer in the axial direction L than the slots 21. In the case where the second segment conductor 6 is disposed in the slots 21, the joint portions 43 of the conductor side portions 41 are positioned on the first axial side L1 with respect to the end portions of the slots 21 (stator core 2) on the first axial side L1. In this manner, in the example illustrated in FIGS. 23 and 24, the joint portions 43 of the first segment conductor 5 and the joint portions 43 of the second segment conductor 6 are joined to each other outside the slot 21. With such a configuration, the joint portions 43 to be joined to each other cannot be pressed toward the inner wall surface 21b of the slot 21 on the radially outer side R2 in the pressing process S13 (see FIG. 7). In addition, movement in the radial direction R of the conductor side portions 41 positioned outside the slot 21 (here, the conductor side portions 41 of the first segment conductor 5) cannot be regulated utilizing the inner wall surface 21b of the slot 21 on the radially outer side R2 in the regulation process S15 (see FIG. 8) and the insertion process S17. Therefore, it is suitable if movement in the radial direction R of the conductor side portions 41 positioned outside the slot 21 is regulated using a jig etc. that has portions that face, from the radially outer side R2, the conductor side portions 41 positioned outside the slot 21 and positioned most on the radially outer side R2.

(9) The configuration disclosed in each of the embodiments discussed above may be applied in combination with a configuration disclosed in any other embodiment unless any contradiction occurs. Also regarding the other configurations, the embodiment disclosed herein is merely illustrative in all respects. Thus, a variety of alterations can be made, as appropriate, without departing from the scope and spirit of the present disclosure.

11. Overview of Above Embodiments

The overview of the method (S1) of manufacturing the rotary electric machine armature (1) described above will be described below.

There is provided
a method (S1) of manufacturing a rotary electric machine armature (1) that includes a cylindrical armature core (2) in which a plurality of slots (21) that extend in an axial direction (L) are disposed in a circumferential direction and a coil (3) wound around the armature core (2), the slots (21) having respective radially opening portions (21a) that open in a radial direction (R), and the coil (3) being constituted by joining a plurality of segment conductors (4) to each other, the method (S1) including:

a preparation step (S10) of preparing a plurality of the segment conductors (4) and preparing the armature core (2), the segment conductors (4) having respective conductor side portions (41) that extend along the axial direction (L) and respective crossover portions (42) connected to the conductor side portions (41) on an outer side of the armature core (2) in the axial direction (L), the conductor side portions (41) being provided with respective joint portions (43) that have respective facing surfaces (44);

an arrangement step (S12) of arranging, when the segment conductor (4), among the plurality of segment conductors (4), the crossover portion (42) of which is disposed on one side (L1) in the axial direction (L) with respect to the armature core (2), is defined as a first segment conductor (5) and the segment conductor (4), the crossover portion (42) of which is disposed on the other side (L2) in the axial direction (L) with respect to the armature core (2), is defined as a second segment conductor (6), at least either the conductor side portions (41) of the first segment conductor (5) or the conductor side portions (41) of the second segment conductor (6) in the slots (21) such that the facing surface (44) of one of the joint portions (43) of the first segment conductor (5) and the facing surface (44) of one of the joint portions (43) of the second segment conductor (6) face each other;

a regulation step (S15) of regulating movement of the conductor side portions (41) in the radial direction (R); and a joint step (S14) of joining the joint portion (43) of the first segment conductor (5) and the joint portion (43) of the second segment conductor (6) to each other by pressing at least one of the first segment conductor (5) and the second segment conductor (6) in the axial direction (L) such that the first segment conductor (5) and the second segment conductor (6) approach each other while maintaining a regulating state in the regulation step (S15).

With this configuration, movement of the conductor side portions (41) of the segment conductors (4) in the radial direction (R) is regulated. Therefore, displacement and separation of the joint portions (43) of the first segment conductor (5) and the joint portions (43) of the second segment conductor (6) from each other in the radial direction (R) can be restricted when such joint portions are to be joined to each other by pressing the first segment conductor (5) and the second segment conductor (6) in the axial direction (L). Thus, the segment conductors (4) can be easily joined to each other appropriately.

Preferably, the arrangement step (S12) includes arranging both the conductor side portions (41) of the first segment conductor (5) and the conductor side portions (41) of the second segment conductor (6) in the slots (21); and the joint step (S14) includes joining the joint portions (43) of the first segment conductor (5) and the joint portions (43) of the second segment conductor (6) to each other in the slots (21).

In this configuration, both the conductor side portions (41) of the first segment conductor (5) and the conductor side portions (41) of the second segment conductor (6) are disposed in the slots (21). Therefore, movement of the conductor side portions (41) in the radial direction (R) can be regulated utilizing the inner wall surfaces (21b) of the slots (21). Thus, displacement and separation of the joint portions (43) of the first segment conductor (5) and the joint portions (43) of the second segment conductor (6) from each other in the radial direction (R) can be easily restricted when such joint portions are to be joined to each other.

Preferably, the method (S1) further includes a joint material arrangement step (S11) of disposing a conductive joint material (8) on at least one of the facing surfaces (44) which face each other, the conductive joint material (8) joining the joint portions (43) of the first segment conductor (5) and the joint portions (43) of the second segment conductor (6) to each other while securing conductivity; and the joint step (S14) includes joining the joint portions (43) of the first segment conductor (5) and the joint portions (43) of the second segment conductor (6) to each other by heating the conductive joint material (8).

With this configuration, the segment conductors (4) can be joined to each other appropriately by the conductive joint material (8) while securing conductivity.

Preferably, the joint portions (43) of the first segment conductor (5) and the joint portions (43) of the second segment conductor (6) are shaped to be fitted with each other in the axial direction (L); and the joint step (S14) includes fitting the joint portions (43) of the first segment conductor (5) and the joint portions (43) of the second segment conductor (6) with each other to be joined by pressing at least one of the first segment conductor (5) and the second segment conductor (6) in the axial direction (1) such that the joint portions (43) of the first segment conductor (5) and the joint portions (43) of the second segment conductor (6) approach each other in the axial direction (L).

In this configuration, the joint portions (43) of the first segment conductor (5) and the joint portions (43) of the second segment conductor (6) are fitted with each other to be joined. Thus, the joint portions (43) of the first segment conductor (5) and the joint portions (43) of the second segment conductor (6), which are joined to each other, cannot be easily separated from each other.

Preferably, the regulation step (S15) includes disposing a regulation member (10) on a side of the radially opening portion (21a) with respect to the conductor side portion (41) positioned most on the side of the radially opening portion (21a) in the slot (21); and the regulation member (10) has a regulation surface (11) that faces the conductor side portion (41) and that regulates movement of the conductor side portion (41) in the radial direction (R).

In this configuration, the regulation member (10) is disposed such that all the conductor side portions (41) in the slot (21) are positioned between the regulation surface (11) and the inner wall surface (21b) of the slot (21) on the opposite side from the side of the radially opening portion (21a). Thus, movement of the conductor side portions (41) in the radial direction (R) can be regulated with a simple configuration.

Preferably, the regulation surface (11) is formed so as to face an object region (OA) which is an entire region or a part of a region, in the axial direction (L), of both the conductor side portions (41) of the first segment conductor (5) and the conductor side portions (41) of the second segment conductor (6), and is shaped along a surface of the object region (OA) that faces the regulation surface (11).

With this configuration, movement in the radial direction (R) of the object region (OA), which is set in the entire region or a part of the region of the conductor side portions (41) in the axial direction (L), can be regulated appropriately by the regulation surface (11) which faces the object region (OA). Here, the regulation surface (11) is shaped along the object region (OA) of the conductor side portions (41). Thus, movement of the conductor side portions (41) in the radial direction (R) can be regulated stably by such a regulation surface (11).

Preferably, the joint step (S14) includes fixing the regulation surface (11) in position in the radial direction (R).

With this configuration, the regulation member (10) is not moved in the radial direction (R) in the joint step (S14). Thus, the regulating state of the conductor side portions (41) by the regulation member (10) can be maintained appropriately in the joint step (S14).

INDUSTRIAL APPLICABILITY

The technology according to the present disclosure can be utilized for a method of manufacturing a rotary electric machine armature that includes a cylindrical armature core in which a plurality of slots that extend in the axial direction are disposed in the circumferential direction and a coil wound around the armature core.

The invention claimed is:

1. A method of manufacturing a rotary electric machine armature that includes a cylindrical armature core in which a plurality of slots that extend in an axial direction are disposed in a circumferential direction and a coil wound around the armature core, the slots having respective radial openings that open in a radial direction, and the coil being formed by joining a plurality of segment conductors to each other, the method comprising:

preparing the plurality of the segment conductors and preparing the armature core, the segment conductors having respective conductor side portions that extend along the axial direction and respective crossover portions connected to the conductor side portions on an outer side of the armature core in the axial direction, the conductor side portions being provided with respective joint portions that have respective facing surfaces;

arranging, when the segment conductors, among the plurality of segment conductors, the crossover portions of which are disposed on one side in the axial direction with respect to the armature core, are defined as first segment conductors and the segment conductors, the crossover portions of which are disposed on the other side in the axial direction with respect to the armature core, are defined as second segment conductors, at least either the conductor side portions of the first segment conductors or the conductor side portions of the second segment conductors in the slots such that the facing surface of one of the joint portions of the first segment conductors and the facing surface of one of the joint portions of the second segment conductors face each other;

regulating movement of the conductor side portions in the radial direction; and joining the joint portions of the first segment conductors and the joint portions of the second segment conductors to each other by pressing at least one of the first segment conductors and the second segment conductors in the axial direction such that the first segment conductors and the second segment conductors approach each other while maintaining a regulating state, wherein:

a plurality of the conductor side portions is arranged in the radial direction within each one of the slots, the regulating includes disposing a plurality of regulation members on a side of the radial openings with respect to the conductor side portions positioned most on the side of the radial openings in the slots, each of the regulation members has a regulation surface that faces the conductor side portions and that regulates movement of the conductor side portions in the radial direction, and in the joining of the joint portions, the regulation surface of the regulation members contacts the conductor side portions, which are positioned on the radially innermost side in the slots, so that movement in the radial direction of the conductor side portions, which are arranged in the radial direction in the slots, is regulated between the regulation surface of the regulation members and the inner wall surface of the slots on a radially outer side.

2. The method of manufacturing according to claim 1, wherein:

the arranging includes arranging both the conductor side portions of the first segment conductors and the conductor side portions of the second segment conductors in the slots; and the joining includes joining the joint portions of the first segment conductors and the joint portions of the second segment conductors to each other in the slots.

3. The method of manufacturing according to claim 1, further comprising:

disposing a conductive joint material on at least one of the facing surfaces which face each other, the conductive joint material joining the joint portions of the first segment conductors and the joint portions of the second segment conductors to each other while securing conductivity, wherein the joining includes joining the joint portions of the first segment conductors and the joint portions of the second segment conductors to each other by heating the conductive joint material.

4. The method of manufacturing according to claim 1, wherein the joint portions of the first segment conductors and the joint portions of the second segment conductors are shaped to be fitted with each other in the axial direction; and the joining includes fitting the joint portions of the first segment conductors and the joint portions of the second segment conductors with each other to be joined by pressing at least one of the first segment conductors and the second segment conductors in the axial direction such that the joint portions of the first segment conductors and the joint portions of the second segment conductors approach each other in the axial direction.

5. The method of manufacturing according to claim 1, wherein the regulation surface is formed so as to face an object region which is an entire region or a part of a region, in the axial direction, of both the conductor side portions of the first segment conductors and the conductor side portions of the second segment conductors, and is shaped along a surface of the object region that faces the regulation surface.

6. The method of manufacturing according to claim 1, wherein the joining includes fixing the regulation surface in position in the radial direction.

* * * * *